US012521957B2

(12) United States Patent
Lorenzetti et al.

(10) Patent No.: US 12,521,957 B2
(45) Date of Patent: Jan. 13, 2026

(54) METHOD TO MAKE A CONTAINER FOR CONSUMER GOODS AND CONTAINER FOR CONSUMER GOODS

(71) Applicant: Philip Morris Products S.A., Neuchatel (CH)

(72) Inventors: Cesare Lorenzetti, Boudry (CH); Alexander Androsenko, Boudry (CH)

(73) Assignee: Philip Morris Products S.A., Neuchatel (CH)

( * ) Notice: Subject to any disclaimer, the term of this patent is extended or adjusted under 35 U.S.C. 154(b) by 54 days.

(21) Appl. No.: 18/580,239

(22) PCT Filed: Jul. 28, 2022

(86) PCT No.: PCT/EP2022/071288
§ 371 (c)(1),
(2) Date: Jan. 18, 2024

(87) PCT Pub. No.: WO2023/006928
PCT Pub. Date: Feb. 2, 2023

(65) Prior Publication Data

US 2024/0343011 A1 Oct. 17, 2024

(30) Foreign Application Priority Data

Jul. 28, 2021 (EP) .................................... 21188237

(51) Int. Cl.
*B31B 50/81* (2017.01)
*B31B 120/10* (2017.01)
(Continued)

(52) U.S. Cl.
CPC ............ *B31B 50/811* (2017.08); *B65D 65/40* (2013.01); *B65D 77/003* (2013.01); *B65D 85/1045* (2013.01); *B31B 2120/102* (2017.08)

(58) Field of Classification Search
CPC . B31B 50/811; B31B 2120/102; B65D 65/40; B65D 77/00; B65D 77/003; B65D 77/042; B65D 85/10; B65D 85/1045
(Continued)

(56) References Cited

U.S. PATENT DOCUMENTS 2,580,050 A 12/1951 Sparks
2,595,911 A 5/1952 Young
(Continued)

FOREIGN PATENT DOCUMENTS

CN 106586068 4/2017
DE 20 2013 003 843 U1 6/2013
(Continued)

OTHER PUBLICATIONS

International Search Report and Written Opinion issued Dec. 2, 2022 in PCT/EP2022/071288 filed on Jul. 28, 2022, 8 pages.
(Continued)

*Primary Examiner* — Bryon P Gehman
(74) *Attorney, Agent, or Firm* — Mueting Raasch Group

(57) ABSTRACT

A method of making a container for consumer goods is provided, the method including: folding a first cellulose-based layer to form a package, the package defining a housing for the consumer goods; forming an outer wrapper, the outer wrapper including a second cellulose-based layer having an inner surface defining an inner area and an outer surface defining an outer area, a first polymeric layer provided on the inner surface, and a second polymeric layer provided on less than 30 percent of the outer surface, the first polymeric layer and the second polymeric layer being heat-sealable layers; wrapping the package with the outer wrapper, the wrapping being made so that the first polymeric layer is provided on an inner side of the second cellulose-based layer; and heating the package and the outer wrapper
(Continued)

to seal the outer wrapper on the package, forming the container.

15 Claims, 6 Drawing Sheets

(51) Int. Cl.

| | |
|---|---|
| ***B65D 65/40*** | (2006.01) |
| ***B65D 77/00*** | (2006.01) |
| ***B65D 85/10*** | (2006.01) |

(58) Field of Classification Search

USPC ....................... 206/264–269, 497; 229/160.1

See application file for complete search history.

(56) References Cited

U.S. PATENT DOCUMENTS

| | | | | |
|---|---|---|---|---|
| 2,945,398 | A | 7/1960 | Mullarkey | |
| 3,463,659 | A | 8/1969 | Dragoon | |
| 4,117,199 | A | 9/1978 | Gotoh | |
| 10,384,862 | B2 | 8/2019 | Kuwahara | |
| 10,472,150 | B2 | 11/2019 | Sebastian | |
| 10,843,865 | B2 * | 11/2020 | Cailleaux | B65D 85/10568 |
| 11,279,541 | B2 * | 3/2022 | Bourgoin | B65D 85/1027 |
| 11,565,865 | B2 * | 1/2023 | Lewis | B65D 77/003 |
| 2007/0193896 | A1 | 8/2007 | Tanbo | |
| 2013/0037438 | A1 | 2/2013 | Dall'Olio et al. | |

FOREIGN PATENT DOCUMENTS

| | | | |
|---|---|---|---|
| EP | 0 688 793 | | 12/1995 |
| GB | 1 216 188 | A | 12/1970 |
| WO | WO 2011/132121 | A1 | 10/2011 |
| WO | WO 2021/023661 | | 2/2021 |
| WO | WO 2022/012961 | | 1/2022 |
| WO | WO 2023/175621 | | 9/2023 |

OTHER PUBLICATIONS

The Definitive Processing Guide and Handbook Plastics Design Library Editor, 2014, pp. 551-554 (https://doi.org/10.1016/B978-1-4377-3481-2.00047-8.

Extended European Search Report for Application No. 21188237.8 dated Jan. 18, 2022 (7 pages).

* cited by examiner

FIG. 7
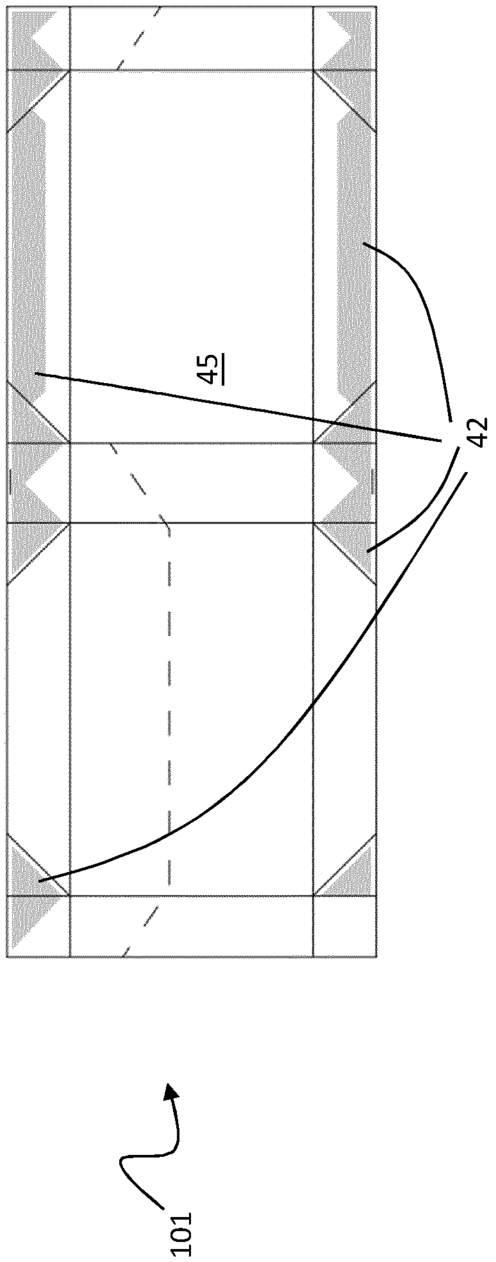
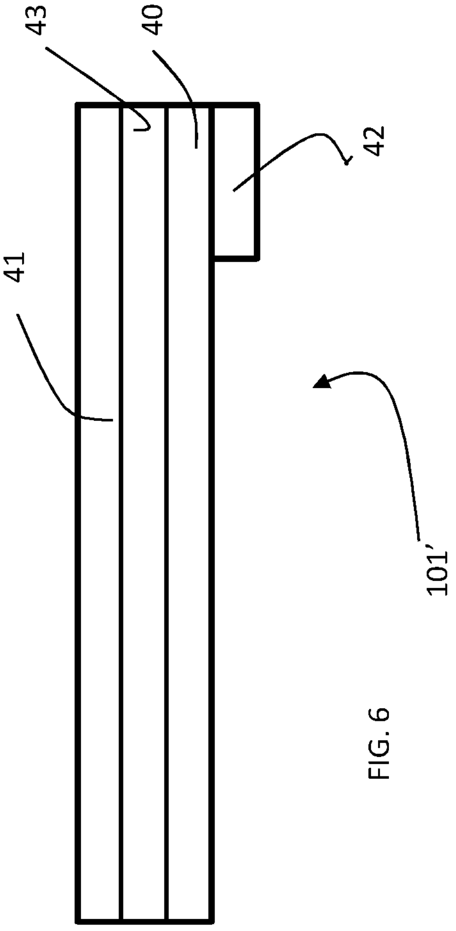
FIG. 6

101
24
48
10
17
21
22
102 = 27
103 = 28
23
104 = 29
105 = 51
1
48 = 19
25
26

METHOD TO MAKE A CONTAINER FOR CONSUMER GOODS AND CONTAINER FOR CONSUMER GOODS

The present invention relates to a method to make a container and to a container for consumer goods. The container is preferably used to contain elongated objects, such as aerosol-generating articles.

It is known to pack cigarettes and more in general aerosol-generating article in carton boxes which are over-wrapped with a biaxially oriented polypropylene film (BOPP film), in other words with a plastic film. This solution has been an industry standard since several decades.

However, plastic packaging may be detrimental for the environment for the likelihood of littering as well as for the use of non-renewable resources and the potential impact on global warming. It is therefore desirable to have a packaging solution that contains less plastic than the available ones.

At the same time, the packaging solution for aerosol-generating articles preferably provides product protection from moisture intake or loss. Indeed, too much or not enough moisture in the aerosol generating articles may alter the smoking experience of the user. Therefore, it is desirable to have a packaging solution that provides product protection from moisture.

Furthermore, it is desirable that the packaging for aerosol-generating articles is "tamper safe", that is, preferably it is evident whether the packaging has been already opened.

There is therefore a need for a method to make a container and a container for consumer goods, adapted to contain—among others—aerosol-generating articles, which has a reduced plastic content with respect to the prior art containers. There is also a need for a method to make a container and a container for consumer goods, adapted to contain—among others—aerosol-generating articles, where it is evident whether the container has been already opened.

According to an aspect, the invention relates to a method of making a container for consumer goods. The method may comprise: folding a first cellulose based layer to form a package, the package defining a housing for the consumer goods. The method may comprise: forming an outer wrapper, the outer wrapper comprising a second cellulose based layer having an inner surface defining an inner area and an outer surface defining an outer area, a first polymeric layer provided on the inner surface and a second polymeric layer provided on less than 30 percent of the outer surface. The first polymeric layer and the second polymeric layer may be heat sealable layers. The method may comprise: wrapping the package with the outer wrapper, wherein the wrapping is made so that the first polymeric layer is provided on an inner side of the second cellulose based layer. The method may comprise: heating the package and the outer wrapper to seal the outer wrapper on the package, forming the container.

In order to form the container according to the invention, a package is formed. The package is formed folding a first cellulose based layer. The first cellulose based layer is a layer comprising cellulose material. Preferably, the first cellulose based layer is a paper layer or a paperboard layer, that is, a layer made of paper or paperboard.

The first cellulose based layer preferably forms a "blank". The blank preferably has the standard shape in this industry, for example it defines a rectangular sheet of material.

The first cellulose based layer, for example, the blank, is then folded in order to create a package. The way in which the blank is folded depends on the desired geometrical shape of the package. For example, typically, the package has the form of a parallelepiped. Preferably, the blank is folded in such a way that the package is closed, that is, it defines a completely closed inner volume, separated from the surroundings. The inner volume defined by the package is preferably completely separated from the outside. In the inner volume, the consumer goods are preferably stored.

Preferably, the package comprises a package front wall, a package left side wall, a package right side wall, a package back wall, a package top wall and a package bottom wall. The package defines an inner surface and an outer surface.

Preferably, no other layers are present in the package in addition to the first cellulose based layer.

A first multi-layer is formed, having the function of an outer wrapper. The outer wrapper comprises a second cellulose based layer, a first polymeric layer and a second polymeric layer. The definition of second cellulose based layer is the same as the first cellulose based layer, so that the second cellulose based layer is preferably a layer comprising cellulose material.

Preferably, the second cellulose based layer is a paper layer or a paperboard layer, that is, a layer made of paper or paperboard.

The first polymeric layer and second polymeric layer are heat sealable layers.

A heat sealable layer is a layer capable of fusion bonding by conventional indirect heating means which generates sufficient heat on at least one film contact surface for conduction to a contiguous film contact surface and formation of a bond interface between the surfaces without loss of the film integrity. The bond interface between contiguous layers preferably has sufficient physical strength to withstand the packaging process and subsequent handling. Heat sealable layers may be designed to meet different conditions of expected use and various heat sealable layers' formulations are known in the art and may be employed with the present invention.

The first polymeric layer is furthermore preferably a heat sealable layer optimized for bonding with the first cellulose based layer. The characteristics of the first polymeric layer, if it has heat sealant properties, are such as the characteristics of being heat sealable are optimised to bond with the first cellulose based layer.

The second polymeric layer is furthermore preferably a heat sealable layer optimized for bonding with the second cellulose based layer. The characteristics of the second polymeric layer, if it has heat sealant properties, are such as the characteristics of being heat sealable are optimised to bond with the second cellulose based layer.

The heat sealable layer, either the first polymeric layer, or the second polymeric layer, or both, has preferably a melting point measured according to differential scanning calorimetry (DSC) lower than 120 degrees Celsius. More preferably, the heat sealable layer has a melting point measured according to DSC lower than 100 degrees Celsius. Even more preferably, the heat sealable layer has preferably a melting point measured according to DSC lower than 80 degrees Celsius.

The second cellulose based layer, the first polymeric layer and the second polymeric layer are permanently attached one to the other. They preferably substantially form a "blank". The blank has preferably the standard shape in this industry, for example it forms a rectangular sheet of multi-layered material. The first polymeric layer and the second polymeric layer are attached to opposite surfaces of the second cellulose based layer.

Preferably, the second cellulose based layer defines an inner surface and an outer surface.

Thus preferably, the first polymeric layer is applied on the inner surface of the second cellulose based layer and the second polymeric layer is applied on the outer surface of the second cellulose based layer.

The first polymeric layer and the second cellulose based layer are attached to each other. Any technique can be used to attach, preferably permanently, the second cellulose based layer and the first polymeric layer together. The first polymeric layer may be glued onto the inner surface of the second cellulose based layer. The first polymeric layer may be coated on the inner surface of the second cellulose based layer. Preferably, the first polymeric layer and the second cellulose based layer have the same geometrical dimensions. Preferably, the first polymeric layer and the second cellulose based layer are congruent. Preferably, the first polymeric layer covers the inner surface of the second cellulose based layer completely.

The second polymeric layer and the second cellulose based layer are attached to each other. Any technique can be used to attach, preferably permanently, the second cellulose based layer and the second polymeric layer together. The second polymeric layer may be glued onto the outer surface of the second cellulose based layer. The second polymeric layer may be coated on the outer surface of the second cellulose based layer. Preferably, the second polymeric layer covers only an area smaller than 30 percent of the area of the outer surface of the second cellulose based layer completely. The second polymeric layer covers one or more portions of the outer surface of the second cellulose based layer. The sum of the areas of the covered portions of the outer surface of the second cellulose based layer by the second polymeric layer is less than 30 percent of the total area of the outer surface of the second cellulose based layer.

Preferably, the second cellulose based layer defines a first end and a second end. Preferably, the second polymeric layer covers portion of the outer surface of the second cellulose based layer located at the first end or at the second end. More preferably, the second polymeric layer covers portion of the outer surface of the second cellulose based layer located at the first end and at the second end.

The second polymeric layer may be applied according to different patterns. Preferably, the second polymeric layer has the function of sealing the flaps of the outer wrapper that forms when the outer wrapper is wrapped around the package in an "envelope type folding". The outer wrapper with such a pattern of the second polymeric layer may then be wrapped and sealed on the outer surface of the package, thanks to the first polymeric layer which faces the outer side of the package, without a need of heat sealable coating on the package. This results in a significant simplification of the manufacturing process of the container while still providing moisture protection.

Preferably, the outer wrapper comprises a metallized layer.

By providing an outer wrapper having a metallized layer, or a metallized outer wrapper, the barrier features of the outer wrapper may be improved. The metallized outer wrapper, may have a significantly reduced permeability to gases or vapours such as oxygen or moisture, thus providing additional protection to the consumer goods housed within the container. The outer wrapper may include additional layers, for example additional barrier layers may be added with the purpose of enhancing the barrier performances of the resulting container. For example, a pre-coated second cellulose based layer may be used as substrate for the manufacturing of the outer wrapper of the present invention. Pre-coated second cellulose based layers for instance may comprise one or more layers of polyvinyl-alcohol (PVOH), polyethylene-co-vinyl-alcohol (EVOH), polyvinylidene dichloride coatings (PVDC), and styrene-butadiene or styrene-acrylate latexes. These pre-applied coatings (often applied in the paper-mills) may help to achieve a second cellulose based layer with excellent surface planarity, hence further enhancing the performances of the coatings described in this invention. Furthermore, pre-applied coatings, such as PVOH, EVOH and PVDC may add additional functionalities such as barrier to odors, aromas and oxygen to the resulting container of the invention. Such pre-applied coatings may often contain mineral fillers such as calcium carbonate, kaolin, talcum, mica or other platelet type minerals.

The first multi-layer (outer wrapper) is wrapped around the outer surface of the package. Preferably, the first multi-layer covers the outer surface of the package completely. Preferably, no portion of the outer surface of the package can be seen from the outside when the package is wrapped by the outer wrapper. The wrapping is performed in such a way that the first polymeric layer is on an inner side with respect to the second polymeric layer. Thus, when the package is wrapped by the outer wrapper, the first polymeric layer is in contact with the first cellulose based layer.

Furthermore, the first multi-layer is folded in such a way that the first polymeric layer is located inwardly with respect to the second polymeric layer.

Preferably, the first cellulose based layer includes the inner surface of the package. The inner surface of the first cellulose based layer is therefore the inner surface of the package and in turn the inner surface of the container. Preferably, the second cellulose based layer comprises the outer surface of the container. Preferably, the outer surface of the container is, at least for a portion, a free surface of the second cellulose based layer.

In this way, a wrapped package is formed. The wrapping preferably takes place folding the blank of the outer wrapper around the package in order to cover the whole outer surface of the package with the outer wrapper. The resulting geometrical shape of the wrapped package is substantially identical or very similar to the geometrical shape of the package. The outer wrapper is folded around the package in such a way that contact is made between the walls of the package and the outer wrapper. Preferably, the outer wrapper is in contact with all walls of the package. Preferably, the outer wrapper is in contact with the package front wall, the package left side wall, the package right side wall, the package back wall, the package top wall and the package bottom wall.

Heat is then applied to the package wrapped by the first multi-layer. Preferably, heat is applied from the outside of the wrapped package. Preferably, both heat and pressure are applied to the wrapped package. The heat or pressure or both seals the first polymeric layer onto the outer surface of the package. The first polymeric layer bonds onto the first cellulose based layer. In addition, the application of heat and pressure seals the second polymeric layer on itself or on the second cellulose based layer, "closing" the outer wrapper on itself. Preferably, the heat applied to the outer wrapper is such that the first polymeric layer or the second polymeric layer reaches a temperature lower than 100 degrees Celsius, more preferably lower than 80 degree Celsius. Preferably, the pressure applied to the outer wrapper is comprised between 1 kiloPascal and 100 kiloPascal.

The material of the first polymeric layer partially melts in order to seal itself on the package, sealing in this way the outer wrapper on the package. The material of the first polymeric layer bonds with the first cellulose based layer.

The material of the second polymeric layer, when the first multi-layer is folded and wrapped around the package, is located at the top wall and bottom wall of the container. In other words, the second polymeric layer covers portions of the outer surface of the second cellulose based layer that, when the blank is folded, correspond to the top wall or the bottom wall or both of the container. When the material of the second polymeric layer melts, it seals the outer wrapper on itself, blocking the folds formed at the bottom wall and top wall of the package.

Production of the container is simplified, due to the fact that with a single heat application, both the first polymeric layer and second polymeric layer melt and seal the outer wrapper on the package.

After the application of heat or pressure or both, the container according to the invention is formed. The container is the wrapped package after heat or pressure or both is applied, so that the outer wrapper is permanently attached to the package.

After the application of heat or pressure or both, the outer wrapper is permanently attached to the package and it is not possible to remove the same without deforming or damaging the container.

Preferably, the container comprises a container front wall, a container left side wall, a container right side wall, a container back wall, a container top wall and a container bottom wall. These walls corresponds to the wrapped package front wall, wrapped package left side wall, wrapped package right side wall, wrapped package back wall, wrapped package top wall and wrapped package bottom wall, respectively. The container has an inner surface and an outer surface. The container inner surface is the inner surface of the package.

Preferably, the first cellulose based layer comprises the inner surface of the container.

Preferably, the second cellulose based layer comprises the outer surface. Preferably, the inner surface of the container is a free surface of the first cellulose based layer. Preferably, the outer surface of the container is a free surface (at least in part) of the second cellulose based layer.

The first polymeric layer and the second polymeric layer may be formed by the same polymeric material. For example, the first polymeric layer and the second polymeric layer may be formed by a polymeric material that has both heat sealing and moisture barrier properties. Preferably, the first polymeric layer and the second polymeric layer have substantially the same melting point.

The first polymeric layer and the second polymeric layer may be formed by two different polymeric materials.

The first cellulose based layer and the second cellulose based layer may be formed by the same cellulose based material.

Once wrapped, the outer surface of containers realized according to the invention may be printed, embossed, debossed or otherwise embellished with manufacturer or brand logos, trademarks, slogans and other consumer information and indicia. Being the outer surface of the container made of cellulose based material; printing on it is easy and can be done according to standard techniques in the art.

Furthermore, other elements may be part of the container formed according to the method of the invention. For example, the container may include an inner package containing the consumer goods, such as the aerosol-generating article. The inner package may be located inside the package. Preferably, the inner package is formed of metal foil or metallised paper. The inner package material may be formed as a laminate of a metallised polyethylene film, and a liner material.

The container according to the invention has a recyclability equal to or better than current packaging solutions. Equal or less amount of plastic is used and equal or more amount of cellulose based material is used in the realization of the container of the invention when compared with cellulosed based containers wrapped with a transparent plastic film.

At the same time, because the second cellulose based layer forms substantially the outer surface of the container, the consumer perceives the container as having an increased eco-friendliness. Further, if any indicia are provided on the outer surface of the second cellulose based layer, such as registration marks, these can still be easily formed according to standard processes.

Containers according to the invention are easy to manufacture and do not require any substantial modification of the existing packing apparatus. In particular, there is substantially no need to modify the folding process for forming the package using the blank of the first multi-layer or the format of the packing machine handling the blank.

Furthermore, being the outer wrapper permanently attached to the package, there is no waste produced when the user opens the container. On the contrary, in standard containers, the external plastic film is normally removed.

According to another aspect, the invention relates to a container for consumer goods. The container comprises a package comprising a box portion and a lid portion, the package defining a housing for the consumer goods, the lid portion being hinged to the box portion by a hinge line, an opening line separating the box portion and the lid portion outside the hinge line, the box portion and the lid portion being formed by folding a first multi-layer blank comprising a first cellulose based layer. The container may comprise an outer wrapper wrapped and sealed on the package and covering at least partly the opening line. The outer wrapper may comprise: a second cellulose based layer having an inner surface and an outer surface. The outer wrapper may comprise: a first polymeric layer provided on the inner surface of the second cellulose based layer. The outer wrapper may comprise: a second polymeric layer provided on less than 30 percent of the area of the outer surface of the second cellulose based layer. The first polymeric layer and second polymeric layer may be heat sealable layers.

It is preferred that containers for consumer goods have a lid portion in order to easily access the consumer goods contained inside the container. The lid portion is movable between the closed position and the open position. When the lid portion is in the closed position, the container defines a closed housing of the consumer goods. Further, when the lid portion is in the open position, the housing containing the consumer goods is accessible.

In known solutions, a container having a lid portion may not provide tamper proof evidence, in other words it is difficult to assess when the container has been opened for the first time. According to the invention, a container is formed as detailed by the first aspect of the invention and having the advantages already outlined in the previous aspect. In addition, the container of the invention is also tamper-proof, because in order to open the lid portion, the outer wrapper needs to be broken.

The package is formed by folding the first cellulose based layer. The first cellulose based layer in the shape of a blank may include an opening line and a hinge line so constructed that, when the blank is folded to form the package, the package is divided in a lid portion and a box portion by the opening line and by the hinge line. Preferably, the hinge line and the opening line are contiguous. Preferably, the opening line and the hinge line form a closed loop on the package outer surface. Preferably, the opening line includes a first end and a second end. Preferably, the hinge line includes a first end and a second end. Preferably, the first end of the hinge line touches (is in contact to) the first end of the opening line. Preferably, the second end of the hinge line touches the second end of the opening line.

The opening line is a first weakened line. The first weakening line may be an opening cut. The opening cut may be formed by the edge of the lid portion closing on the box portion. The lid portion remains tightly closed against the box portion due to the presence of the outer wrapper which keeps the lid portion closed on the box portion.

The first weakened line may be continuous or discontinuous (for example, perforated). Further, the first weakened line may be formed using any suitable technique or combination of techniques, for example, laser cutting or mechanical cutting (for example, die cutting or kiss cutting).

Preferably, the first cellulose based layer has a given thickness. The first weakened line may have any suitable depth in a direction transverse to the inner and outer surfaces of the first cellulose based layer. Preferably, the first weakened line has a depth that is at least about 90 percent of a total thickness of the first cellulose based layer. More preferably, the first weakened line has a depth that is about 100 percent of the total thickness of the first cellulose based layer, that is, it is a cut.

Preferably, the lid portion comprises a lid front wall, a lid left side wall, a lid right side wall, a lid back wall, and a lid top wall. The lid portion has an inner surface and an outer surface. Preferably, the box portion comprises a box front wall, a box left side wall, a box right side wall, a box back wall, and a box top wall. The box portion has an inner surface and an outer surface.

Preferably, the hinge line is realized on the back wall of the package. The hinge line divides the back wall of the package into two parts: the back wall of the lid portion and the back wall of the box portion. Preferably, the hinge line is formed parallel to the bottom wall of the package.

The front wall of the package preferably comprises a segment of the opening line. The opening line divides the front wall of the package into two parts: the front wall of the lid portion and the front wall of the box portion. Preferably, the segment of the opening line is realized parallel to the bottom wall of the package.

The left side wall and right side wall of the package also preferably include each a segment of the opening line. Preferably, each segment of the opening line on the side walls connect the hinge line on the back wall to the segment of the opening line on the front wall of the package. The opening line divides each of the side walls of the package into two parts: the left (right) side wall of the lid portion and the left (right) side wall of the box portion. The opening line on the side walls may form an angle with the back wall different from 90 degrees. The segment of the opening line on the right side wall and left side wall of the package is thus preferably not parallel to the bottom wall of the package. Preferably, the height of the hinge line is different from the height of the segment of the opening line on the front wall of the package.

When the package is wrapped by the outer wrapper, which is then heated and sealed onto the package, the outer wrapper becomes an integral part of the package, forming the container of the invention. The outer wrapper cannot be separated from the package without damaging both outer wrapper and package.

The outer wrapper covers at least partially the opening line. Preferably, the outer wrapper covers the opening line completely. The outer wrapper preferably covers the opening line and the hinge line. Thus, in order to open the lid portion from the box portion and access the consumer goods stored in the housing defined by the package, the outer wrapper has to be broken because it covers at least partly the opening line. The outer wrapper needs to be broken in order to allow the movement of the lid portion from the closed position to the opened position. The opening line is the edge of the lid portion.

Both the first weakened line and the outer wrapper are preferably teared or broken when the container is opened.

The position where most probably the outer wrapper breaks if a force is applied to separate the box portion from the lid portion is in the neighbourhood of the opening line. The package opens at the opening line. When the outer wrapper is broken, the lid portion may move rotating around the hinge line, opening the package. At the beginning of this movement, the lid portions breaks the outer wrapper that covers at least partly the opening line.

Due to the breakage of the outer wrapper, it is impossible to hide the fact that the container has been at least opened once after manufacturing. Furthermore, the outer wrapper cannot be exchanged, because it is permanently sealed onto the package. In this way, the user buying the container according to the invention can be assured that the container has never be opened if he sees no damage in the outer wrapper. Consequently, the user can be sure that no one has tampered with the consumer goods present therein after they have been inserted in the package.

In the following, the lid portion wrapped with the outer wrapper after the tearing of the same, that is, after the “first opening”, is called the lid of the container, and the box portion wrapped with the outer wrapper after the tearing of the same, that is, after the “first opening”, is called the box of the container.

Preferably, the step of heating the package and the outer wrapper comprises: heating the package and the outer wrapper while applying pressure, to seal the outer wrapper on the package. Preferably, in order to properly seal the outer wrapper onto the package, both heat and pressure are applied, so that the first polymeric layer bonds onto the first cellulose based layer and the second polymeric layer closes the outer wrapper on itself.

Preferably, the method comprises: folding the first cellulose based layer to form a package comprising a lid portion and a box portion, the box portion and the lid portion being divided by a opening line, the lid portion being hinged to the box portion. Preferably, the method comprises: wrapping the box portion and the lid portion with the outer wrapper, the outer wrapper covering, at least in part, the opening line. A package having a lid portion and a box portion is preferably realised. The lid portion and box portion are divided by an opening line. The advantages of this configuration have been already outlined with reference to an aspect of the invention and are not repeated herewith.

Preferably, the opening line comprises a first weakened line. The first weakened line may be a complete cut.

Preferably, the method comprises the step of: covering the opening line with the outer wrapper completely. The outer wrapper covers the opening line in all its extension. For example, the opening line extends on the front wall and on left and right side walls of the package. The outer wrapper thus wraps the package covering its front wall, left side wall and right side wall. Preferably, the outer wrapper covers the whole outer surface of the package. A better control of structural integrity of the resulting container is obtained.

Preferably, the step of folding a first cellulose based layer forming a package comprises folding the first cellulose based layer forming a package defining a base wall and a top wall; and the method comprises the step of: providing the second polymeric layer on portions of the outer surface of the second cellulose based layer which cover the top wall or the base wall of the package when the outer wrapper is wrapped around the package. The second polymeric layer is used mainly to "close" the flaps of the outer wrapper when folded around the package at the top wall and at the base wall. The remaining of the outer surface of the second cellulose based layer is preferably not covered by the second polymeric layer, so that the second cellulose based layer is visible.

Preferably, the step of forming an outer wrapper comprises the step of forming an outer wrapper including a third polymeric layer. More preferably, the third polymeric layer is located between the second cellulose based layer and the first polymeric layer. Even more preferably, the third polymeric layer is a moisture barrier layer.

case a third polymeric layer is present, the first polymeric layer may be applied in patterns and only partially cover the surface of the third polymeric layer.

When the third polymeric layer is present, the first polymeric layer may only cover less than 30% of the surface of the polymeric layer.

For purposes of the present invention, a moisture barrier layer is a layer that has a water vapour or moisture transmission rate (VWTR) of equal to or less than 60 grams/(square meter) per 24 hours at 38 degrees Celsius and 90 percent relative humidity when determined by ISO 2528:1995 or ASTM F3299. Preferably, a moisture barrier layer of a container of the present invention has a WVTR of less than 20 grams/(square meter) or even preferably 10 grams/(square meter) per 24 hours at 38 degrees Celsius and 90 percent relative humidity. When wrapped around the package defining the inner volume, the outer wrapper may control relative humidity within the inner volume. For this purpose, the third polymeric layer, belonging to the outer wrapper, is a moisture barrier layer. The third polymeric layer may comprise fillers such as calcium carbonate, kaolin, talcum, mica or other platelet type minerals. Preferably the third polymeric layer is not sealable and may be crosslinked or comprise crosslinking agents.

Preferably, the package can be opened and closed. Preferably, the relative humidity in the inner volume is within a given desired range. The desired range is the range of relative humidity optimal for the consumer goods stored in the inner volume. When the container is opened to access one or more consumer goods stored in the inner volume, the relative humidity of the inner volume begins to equilibrate with the external environment and may cause the relative humidity of the inner volume to deviate from the desired range. If the container is closed, the moisture barrier layer may help in restoring a desired humidity level within the desired range. This is particularly advantageous when one or more consumer goods remain in the container after opening and closing.

Preferably, the second cellulose based layer defines an inner surface and an outer surface.

Preferably, the step of forming the outer wrapper comprises: coating the inner surface of the second cellulose based layer with the first polymer layer. More preferably, the method comprises the step of coating the whole inner surface of the second cellulose based layer with the first polymer layer. Among the possible techniques to form a multi-layer in which the various layers of the multi-layer form an integral body, coating is the preferred one, for its reliability and relatively easy execution. Due to the tensile strength of the first polymeric layer, the blank formed by the first multi-layer may contain less cellulose based material than a blank for cigarettes containers realized according to the prior art.

During the coating of the second cellulose based layer with the material forming the first polymeric layer, preferably care is taken to prevent the formation of pin-holes and other defects that may negatively affect the moisture barrier performance or heat sealing properties of the coated material. The formation of defects can be minimized by carefully selecting the application technique, the drying conditions and the rheology of the applied dispersion of polymers. In particular, techniques such as rod coating, slot die coating and curtain coating allow to prepare polymer layers with reduced defects hence enhanced barrier properties. It is however possible to apply satisfactory coatings also using printing techniques such as flexographic printing or gravure coating. In case of these latter techniques, the coating is preferably applied by multiple layers until reaching the desired thickness of the first polymeric layer. In fact, each subsequent layer or step in printing allows to fill the defects of pin-holes left during the previous coating step. The coating made of the first polymeric material may be cast on the second cellulose based layer, for example a paper or paperboard sheet, from the molten state using well-known techniques in the field such as hot melt coating or extrusion coating. Details on these processes can be found for example in "The Definitive Processing Guide and Handbook" Plastics Design Library Editor, 2014, Pages 551-554 (https://doi.org/10.1016/B978-1-4377-3481-2.00047-8).

Alternatively, when the outer wrapper comprises the third polymeric layer, the step of forming an outer wrapper comprises: coating the inner surface of the second cellulose based layer with the third polymer layer; and coating an inner surface of the third polymer layer with the second polymer layer. Preferably, the third polymer layer is a moisture barrier layer. This layer is positioned between the second cellulose based layer and the first polymeric layer. When the outer wrapper is wrapped around the package and heat or pressure or both is applied, the first polymeric layer melts and glues to the outer surface of the package. The third polymeric layer is preferably unaffected and provides for the moisture barrier properties. Having two different layers improves the properties of the container, because the provision of more than one layer allows to enhance moisture barrier or sealability performances or both by using specialized compositions in each layer between first polymeric layer and third polymeric layer.

Preferably, forming the outer wrapper comprises: coating the outer surface of the second cellulose based layer with the second polymeric layer. In this way, two heat sealable layers are formed on the two opposite sides of the outer wrapper. In this way, the sealing of the outer wrapper onto the package is optimized. Preferably, the coating of the second cellulose based layer by the second polymer layer is performed according to the preferred characteristics described with reference to the coating of the second cellulose based layer by the first polymeric layer.

Preferably, the method comprises: folding the first cellulose based layer to form a package comprising a lid portion and a box portion, the box portion and the lid portion being divided by an opening line, the lid portion being hinged to the box portion. Preferably, the method comprises: wrapping the box portion and the lid portion with the outer wrapper, the outer wrapper covering, at least in part, the opening line. Preferably, the method comprises: forming a second weakened line on the portion of the outer wrapper covering the opening line. More preferably, the method comprises: opening the lid portion by tearing or breaking the second weakened line. In order to properly open the package rotating the lid portion about the hinge line and access the consumer goods stored in the container, it is preferred to have an easy opening which allows the user to perform the opening without applying too much force. Furthermore, due to the fact that the outer wrapper covers at least in part the opening line, it is preferred that the needed tearing or breaking of the outer wrapper is somewhat controlled. For this purpose, a second weakened line is formed on the outer wrapper. Preferably, the second weakened line is formed on the outer surface of the outer wrapper. Preferably, the second weakened line follows the extension of the opening line. In a front view, preferably, the second weakened line is positioned at the same height as the opening line. In a left side view and in a right side view, preferably, the second weakened line is positioned at the same height as the opening line. In this way, when a force is applied to the container in order to open the lid portion, for example by forcing a rotation of the lid portion about the hinge line, the force required to break or tear the outer wrapper at the second weakened line is lower than the force required to break or tear the outer wrapper without the presence of the second weakened line. In addition, the outer wrapper tears or breaks in a controlled way and the aesthetic of the opened container is improved.

Preferably, the opening line comprises the first weakened line. More preferably, the method comprises: opening the lid portion by tearing or breaking the opening line and the second weakened line. In case the opening line is a first weakened line, with the same movement the user breaks or tears both the first weakened line and the second weakened line.

Preferably, the second weakened line may be manufactured by any suitable partial cutting process of the second cellulose based layer (that is, the cutting process cuts less that 100% of the thickness of the second cellulose based layer or the cutting process cuts less than 100% of the width of the second cellulose based layer, when in the unfolded condition).

Preferably, the method comprises the step of forming the second weakened line on the second cellulose based layer before providing the second cellulose based layer with the first polymeric layer or the second polymeric layer. After the partial cutting of the second cellulose based layer, the first polymeric layer and the second polymeric layer are applied to the second cellulose based layer. This second weakened line may be made on the outer wrapper preferably before the wrapping of the package by the outer wrapper. Preferably, the second weakened line is formed on the second cellulose based layer before it is coated by the second polymeric layer or first polymeric layer. Alternatively, the second weakened line is formed on the second cellulose based layer when the latter is already coated by the first polymeric layer or by the second polymeric layer (or also by the third polymeric layer, if the third polymeric layer is present) or both.

Preferably, the method comprises: printing indicia regarding the consumer goods or the manufacturer of the consumer goods on portions of the outer surface of the second cellulose based layer not covered by the second polymeric layer. Preferably, the container defines an outer surface. Preferably, the outer surface of the container is formed—at least in part—by an outer surface of the second cellulose based layer. Preferably, the outer surface of the container is made of paper or paperboard. Standard printing techniques can be therefore used to print any indicia on this outer surface. The printing cannot be easily removed and it remains substantially unaltered for a long period of time. This for example allows health warnings to be printed on the container without the risk that they can be easily removed (the outer wrapper cannot be removed from the package after sealing).

Preferably, the step providing a first polymeric layer, or providing a second polymeric layer, or providing a third polymeric layer comprises forming a composition comprising a polymer or copolymer of ethylene. Preferably, the step providing a first polymeric layer, or providing a second polymeric layer, or providing a third polymeric layer comprises forming a composition comprising a polymer or copolymer of propylene. Preferably, the step providing a first polymeric layer, or providing a second polymeric layer, or providing a third polymeric layer comprises forming a composition comprising a copolymer of styrene acrylate.

Preferably, the step providing a first polymeric layer, or providing a second polymeric layer, or providing a third polymeric layer comprises forming a composition comprising a copolymer of styrene butadiene. Preferably, the step providing a first polymeric layer, or providing a second polymeric layer, or providing a third polymeric layer comprises forming a composition comprising a copolymer of styrene isoprene. Preferably, the step providing a first polymeric layer, or providing a second polymeric layer, or providing a third polymeric layer comprises forming a composition comprising a copolymer of hydrogenated styrene butadiene.

Preferably, the step providing a first polymeric layer, or providing a second polymeric layer, or providing a third polymeric layer comprises forming a composition comprising a copolymer of hydrogenated styrene isoprene. Preferably, the step providing a first polymeric layer, or providing a second polymeric layer, or providing a third polymeric layer comprises forming a composition comprising a copolymer of an ester of acrylic or methacrylic acid. Preferably, the step providing a first polymeric layer, or providing a second polymeric layer, or providing a third polymeric layer comprises forming a composition comprising a copolymer of vinyl acetate. Preferably, the step providing a first polymeric layer, or providing a second polymeric layer, or providing a third polymeric layer comprises forming a composition comprising a copolymer of polybutene.

Preferably, the polymer or copolymer above listed is comprised between 30 percent and 50 percent in weight with respect to the total weight of the composition.

More preferably, the composition comprises a polymer, copolymer or omopolymer of ethylene and propylene. More preferably, the composition comprises a polymer, copolymer or omopolymer of ethylene and 1-butene. More preferably, the composition comprises a polymer, copolymer or omopolymer of ethylene and isobutylene. More preferably, the composition comprises a polymer, copolymer or omopolymer of ethylene and 1-octene. More preferably, the composition comprises a polymer, copolymer or omopolymer of ethylene and 1-exene. More preferably, the composition comprises a polymer, copolymer or omopolymer of ethylene and norbornene. More preferably, the composition comprises a polymer, copolymer or omopolymer of ethylene and vinyl acetate. More preferably, the composition comprises a polymer, copolymer or omopolymer of ethylene and acrylic or metacrylic esters. More preferably, the composition comprises a polymer, copolymer or omopolymer of ethylene and acrylic or metacrylic acids. More preferably, the composition comprises a polymer, copolymer or omopolymer of ethylene and dicyclopentadiene.

More preferably, the composition comprises a polymer, copolymer or omopolymer of propylene and 1-butene. More preferably, the composition comprises a polymer, copolymer or omopolymer of propylene and isobutylene. More preferably, the composition comprises a polymer, copolymer or omopolymer of propylene and 1-octene. More preferably, the composition comprises a polymer, copolymer or omopolymer of propylene and 1-exene. More preferably, the composition comprises a polymer, copolymer or omopolymer of propylene and norbornene. More preferably, the composition comprises a polymer, copolymer or omopolymer of propylene and vinyl acetate. More preferably, the composition comprises a polymer, copolymer or omopolymer of propylene and acrylic or metacrylic esters. More preferably, the composition comprises a polymer, copolymer or omopolymer of propylene and acrylic or metacrylic acids. More preferably, the composition comprises a polymer, copolymer or omopolymer of propylene and dicyclopentadiene. More preferably, the composition comprises a polymer, copolymer or omopolymer of propylene and polybutene.

More preferably, the composition further comprises wax. Preferred waxes are paraffin waxes, microcrystalline waxes, polyethylene waxes or hydrocarbon waxes. The addition to a wax in a certain amount into one or more of the polymers or copolymers above listed decreases the moisture permeability of the polymers or copolymers. This is for example detailed in U.S. Pat. No. 4,117,199. Example of these possible compositions may be found for instance in U.S. Pat. Nos. 2,580,050, 2,595,911, 2,945,398 or EP 0688793.

Preferably, in weight, the content of wax is comprised between 10 percent and 70 percent in weight with respect to the total weight of the composition. More preferably, in weight, the content of wax is comprised between 10 percent and 40 percent in weight with respect to the total weight of the composition. In this way, suitable moisture barrier properties are obtained and a good emulsion is achieved.

Preferably, the composition further comprises: hydrocarbon resin. More preferably, the hydrocarbon resin is hydrogenated hydrocarbon resin. More preferably, the hydrocarbon resin is polyterpene resin. Preferably, the content of hydrocarbon resin is comprised between 30 percent and 50 percent in weight with respect to the total weight of the composition.

Preferably, hydrocarbon resins are polymers or copolymers of C5 and C9 monomers, or polyterpene resins (as described in the book Hydrocarbon Resins, Dr. R. Mildenberg, Dr. M. Zander, Dr. G. Collin, published in 1997 by Wiley, ISBN: 9783527286171)

Preferably, hydrocarbon resins are hydrogenated polymers or copolymers of C5 and C9 monomers, or modified polyterpene resins (as described in the book Hydrocarbon Resins, Dr. R. Mildenberg, Dr. M. Zander, Dr. G. Collin, published in 1997 by Wiley, ISBN: 9783527286171).

Preferably, the step providing a first polymeric layer, or providing a second polymeric layer, or providing a third polymeric layer comprises forming a composition comprising a copolymer of styrene butadiene, a hydrocarbon resin and wax. Preferably, the step providing a first polymeric layer, or providing a second polymeric layer, or providing a third polymeric layer comprises forming a composition comprising a copolymer of styrene isoprene, a hydrocarbon resin and wax. Preferably, the step providing a first polymeric layer, or providing a second polymeric layer, or providing a third polymeric layer comprises forming a composition comprising a copolymer of hydrogenated styrene butadiene, a hydrocarbon resin and wax. Preferably, the step providing a first polymeric layer, or providing a second polymeric layer, or providing a third polymeric layer comprises forming a composition comprising a copolymer of hydrogenated styrene isoprene, a hydrocarbon resin and wax. Preferably, the step providing a first polymeric layer, or providing a second polymeric layer, or providing a third polymeric layer comprises forming a composition comprising a copolymer of an ester of acrylic or methacrylic acid, a hydrocarbon resin and wax. Preferably, the step providing a first polymeric layer, or providing a second polymeric layer, or providing a third polymeric layer comprises forming a composition comprising a copolymer of vinyl acetate, a hydrocarbon resin and wax.

Preferably, the composition is a hot melt composition.

In case of an extrusion coating process, or a hot melt coating process, wherein the second cellulose based layer is coated by the polymeric layer (either the first polymeric layer, or the second polymeric layer, or the third polymeric layer), polymers such as amorphous or low crystallinity polymers and copolymers of propylene, ethylene, vinyl acetate, esters of acrylic or metacrylic acid, polyethylene plastomers, polypropylene plastomers, very low density polyethylene (VLDPE), low-density polyethylene (LDPE), medium-density polyethylene (MDPE), high-density polyethylene (HDPE) are preferred as material forming the first polymeric layer, or the second polymeric layer, or the third polymeric layer. These compositions have the desired heat sealability at the temperatures of interest and may be conveniently formulated with ingredients such as hydrocarbon resins and waxes which allow to optimize rheological, barrier and adhesion properties. These compositions are also preferred because they may have a high flowability when in the molten state. The flowability of a material can be expressed in terms of MFI (melt flow index) at 190 C and 2.16 kg of applied force (ASTM D1238). Preferred heat sealable layers (as first polymeric layer and second polymeric layer) have an MFI above 100 grams/min, more preferably above 500 grams/min. MFI may give an indication of rheology of the first polymeric layer or the second polymeric layer. The higher the MFI, the higher the flowability at reduced shear rate (in this case the shear rate is linked to the pressure applied during sealing). To achieve good sealing of the outer wrapper on the package at relatively low-pressure high MFI is preferred. The lower the applied pressure is, the higher the MFI preferably is.

The definitions of LDPE, MDPE and HDPE herein used are those according to ASTM D0883-20B (Standard Terminology Relating to Plastics) and are as follows: the density of LDPE is comprised between 0.910 grams per cubic centimetre ($g/cm^3$) and 0.925 grams per cubic centimetre ($g/cm^3$); the density of HDPE is higher than or equal to 0.941 grams per cubic centimetre ($g/cm^3$) or greater; the density of MDPE is comprised between 0.926 grams per cubic centimetre ($g/cm^3$) and 0.940 grams per cubic centimetre ($g/cm^3$).

Preferably, the outer wrapper comprises a second weakened line formed on the portion of the outer wrapper covering the opening line. Preferably, the second weakened line is formed on the outer surface of the outer wrapper.

Preferably, the second cellulose based layer has a first thickness and the second weakened line includes an etched line having a depth not greater than 80 percent of the first thickness. Preferably, the second weakened line is realized on the second cellulose base layer only.

Preferably, the second weakened line is not deep enough to form an etching also on the second polymeric layer or third polymeric layer. Having the second polymeric layer heat sealable properties, the absence of the second weakened line on it assures a substantially uniform seal when heat is applied. In case the third polymeric layer is present, an etching would cause an area with possible moisture free exchange. Preferably, the first thickness of the second cellulose based layer is comprised between 30 micrometers and 60 micrometers. Preferably, the depth of the second weakened line is at least 50 percent of the first thickness. Preferably, the depth of the second weakened line is comprised between 50 percent to 80 percent of the thickness of the second cellulose based layer. In this way an easy opening of the container is possible and the properties of the second polymeric layer are not hindered.

Preferably, the first polymeric layer and the second polymeric layer are formed in the same material. Preferably, the first polymeric layer and the second polymeric layer have the same physical and chemical properties. Preferably, the first polymeric layer and the second polymeric layer have the same melting point. In this way, with a single heat application, both first polymeric layer and second polymeric layer melt, closing the outer wrapper on the package. The process of container's formation is simplified. Preferably, the first cellulose based layer has a basis weight comprised between 170 grams per square meter (gsm) and 270 grams per square meter (gsm). Preferably, the weight per square meter of the first cellulose based layer is higher than the weight per square meter of the second cellulose based layer. The first cellulose based layer has a weight per square meter comparable or lower than that of a cellulose layer used to form standard packages for cigarettes known in the art. The rigidity and the mechanical properties of the container according to the invention are preferably similar to those of a cigarette packages known in the art. The "loss" of rigidity due to a lower weight per square meter is compensated by the presence of the first polymeric layer.

Preferably, the thickness of the first polymeric layer is less than 15 micrometers, more preferably less than 10 micrometers.

Preferably, the second cellulose based layer has a basis weight comprised between 40 grams per square meter and 70 grams per square meter. The second cellulose based layer included in the outer wrapper is preferably relatively light, because it does not have to give structural stability to the container.

Preferably, the first polymeric layer has a basis weight comprised between 4 grams per square meter and 15 grams per square meter.

Preferably, the third polymeric layer has a basis weight comprised between 5 grams per square meter and 10 grams per square meter. Preferably, the second polymeric layer has a basis weight comprised between 3 grams per square meter and 15 grams per square meter.

The polymeric layers are selected to have a weight that is enough to achieve the desired heat sealability or moisture barrier properties.

Preferably, the first polymeric layer or the second polymeric layer has a melting point measured according to differential scanning calorimetry (DSC) lower than 120 degrees Celsius. Preferably, the heat sealable layer(s) has a melting point measured according to differential scanning calorimetry (DSC) is lower than 100 degrees Celsius. More preferably, the heat sealable layer has a melting point measured according to differential scanning calorimetry (DSC) is lower than 80 degrees Celsius. A temperature is the claimed range allows to obtain an optimal seal with the materials forming the container without damaging the same.

Preferably, the third polymeric layer has a melting point measured according to differential scanning calorimetry (DSC) higher than the melting temperature of the first polymeric layer and of the second polymeric layer.

Preferably, the third polymeric layer, having the function of a moisture barrier layer, is formulated in order to have a higher melting point than the first polymeric layer and second polymeric layer, which have the function of heat sealable layers. The third polymeric layer preferably does not show a thermoplastic behaviour in the range of temperature and pressure used in the wrapping process. Although the "ingredients" for the preparation of the composition to form the third polymeric layer and the first (second) polymeric layer may belong to the same family, the choice of the specific ingredients/grades may determine a lower or higher melting point with respect to each-other layer. More in general, the choice of the specific ingredients or grades enables to have a material that may or may not be not flowable at a certain temperature. The concept of flowability at a certain pressure and temperature is particularly relevant for compositions that are based on amorphous copolymers, or for those presenting multiple melting points as measured by DSC.

As an example, paraffin wax may be chosen with a melting point of 60 degrees Celsius or with a melting point above 100 degrees Celsius. The addition of one or the other of the two paraffin waxes into the composition, alters the melting point of the whole composition.

Similarly, a hydrogenated styrene ethylene butylene copolymer (SEBS—that is fully amorphous, hence not showing any defined melting point) may be selected on the base of the molecular weight (the lower the highest flow-ability) to design a formulation that may or may be not thermoplastic/flowable at a certain temperature and pressure.

The composition of the third polymeric layer is such that the layer is not thermoplastic/flowable at the temperature or pressure required by the wrapping process, so that it maintains its integrity during the process itself. In this way, if the first polymeric layer and the second polymeric layer are damaged during the sealing/wrapping process, the third polymeric layer, being more "resistant", remains mostly unaffected, by having a higher melting point or by showing a negligible flowability at the wrapping/bonding process temperature(s).

Preferably, the outer wrapper comprises a metallized layer. For example, a pre-coated cellulose based layer may be a metallized paper. For the purpose of this invention. A cellulose based layer may be metallized before the application of one or more polymeric layers. The metallized layer may be a barrier layer with the purpose of enhancing the barrier performances of the resulting container. By providing an outer wrapper having a metallized layer, or a metallized outer wrapper, the barrier features of the outer wrapper may be improved. The metallized outer wrapper, may have a significantly reduced permeability to gases or vapours such as oxygen or moisture, thus providing additional protection to the consumer goods housed within the container. The metallized later may also be used for decorative purposes.

Preferably, the step of providing the outer wrapper comprises applying the metallized layer to the second cellulose based layer.

The metallized layer may be on an inner surface of the second cellulose based layer. Alternatively, the metallized layer may be on an outer surface of the second cellulose based layer. Where the metallized layer is on an outer surface of the of the second cellulose based layer, the metallized layer may impart a more appealing visual appearance to the outer wrapper.

Preferably, the metallized layer is an aluminium layer. However, the metallized layer may be a layer comprising any suitable metal.

Preferably, the metallized layer is between the second cellulose based layer and the first polymeric layer.

The first polymeric layer may be on at least 50 percent of the inner surface of the metallized layer, preferably the first polymeric layer is on at least 80 percent of the inner surface of the metallized layer, more preferably, the first polymeric layer is on the entire inner surface of the metallized layer.

The metallized layer may have a thickness of at least 10 nanometres, preferably, the metallized layer has a thickness of at least 15 nanometres.

The metallized layer may be deposited using a physical vapor deposition (PVD) technique under a high vacuum.

A primer layer may be between the second cellulose based layer and the metallized layer. The primer layer may smoothen the surface of second cellulose based layer and provide a suitable anchoring layer for the deposition of the metallized layer.

A protective layer may cover the metallized layer. The protective layer may protect the metallized layer from damage that may occur during handling and forming of the container. The protective layer can be manufactured by applying solutions or dispersions of appropriate polyester resins such as polycondensates of terephatalic acid, isophthalic acid, adipic acid, azelaic acid, and one or more diols such as ethylene glycol, 1,3-propanediol, 1,4 propane diol, diethylene glycol, neopentyl glycol, 2-methyl-1,3-propanediol. The protective layer may also be manufactured from a mixture from at least two diacids or their methyl esters monomers and at least one or more glycols enable to have polymers with good solubility and adhesion toward the metallic layer. Other suitable compositions suitable for the manufacture of top coatings comprise solutions of polymers such as cellulose acetate or propionate, dispersions of copolymers of various olefins such as ethylene and acrylic or methacrylic acid, solutions or dispersions of hydrogenated hydrocarbon resins.

Containers realized according to the invention find particular application as containers for elongate aerosol-generating articles such as, for example, cigarettes, cigars, cigarillos or other aerosol generators that rely on heating rather than burning tobacco, for example through an electrical heat source or carbon heat source. It will be appreciated that through appropriate choices of the dimensions thereof, containers according to the invention may be designed for different numbers of conventional size, king size, super-king size, slim or super-slim aerosol generating articles. Alternatively, other consumer goods may be housed inside the container.

For example, through an appropriate choice of the dimensions, containers according to the invention may be designed to hold a total of between ten and thirty aerosol-generating articles. The aerosol-generating articles may be arranged in different collations, depending on the total number of aerosol-generating articles.

Containers formed according to the invention may be in the shape of a rectangular parallelepiped, with right-angled longitudinal and right-angled transverse edges. Alternatively, the container may comprise one or more rounded longitudinal edges, rounded transverse edges, bevelled longitudinal edges or bevelled transverse edges, or combinations thereof. Alternatively, the container may have a non-rectangular transversal cross section, for example polygonal such as triangular or hexagonal, semi-oval or semi-circular.

Typically, the outer dimensions of the container are between about 0.5 mm to about 5 mm larger than the dimensions of the bundle or bundles of aerosol-generating articles housed inside the container.

Preferably, containers according to the invention have a height of between about 60 mm and about 150 mm, more preferably a height of between about 70 mm and about 125 mm, wherein the height is measured from the bottom wall to the top wall of the container.

Preferably, containers according to the invention have a width of between about 12 mm and about 150 mm, more preferably a width of between about 70 mm and about 125 mm, wherein the width is measured from one side wall to the other side wall of the container.

Preferably, containers according to the invention have a depth of between about 6 mm and about 150 mm, more preferably a depth of between about 12 mm and about 25 mm wherein the depth is measured from the front wall to the back wall of the container (comprising the hinge between box and lid).

Preferably, the ratio of the height of the container to the depth of the container is in between about 0.3 to 1 and about 10 to 1, more preferably between about 2 to 1 and about 8 to 1, most preferably between about 3 to 1 and 5 to 1.

Preferably, the ratio of the width of the container to the depth of the container is in between about 0.3 to 1 and about 10 to 1, more preferably between about 2 to 1 and about 8 to 1, most preferably between about 2 to 1 and 3 to 1.

Where the container comprises aerosol-generating articles, the container may further comprise waste-compartments (for example for ash or butts) or other consumer goods, for example matches, lighters, extinguishing means, breath-fresheners or electronics. The other consumer goods may be attached to the outside of the container, contained within the container along with the aerosol-generating articles, in a separate compartment of the container or combinations thereof.

The term "inner surface" is used throughout the specification to refer to the surface of a component of the assembled container that is facing towards the interior of the container, for example towards the consumer goods, when the container is in the closed position. The term "outer surface" is used throughout the specification to refer to the surface of a component of the container that is facing towards the exterior of the container. For example, the front wall of the container has an inner surface that is facing the inside of the container and the consumer goods, and an outer surface facing away from the consumer goods. It should be noted that the inside or outside surface is not necessarily equivalent to a certain side of a blank used in the assembly of the container. Depending on how the blank is folded around the consumer goods, areas that are on the same side of the blank can either face towards the inside or the towards the outside of the container.

As used herein, the terms "front", "back", "upper", "lower", "top", "bottom" and "side", refer to the relative positions of portions of containers according to the invention and components thereof when the container is in an upright position an access opening of the container at the top of the container. When describing containers according to the present invention, these terms are used irrespective of the orientation of the container being described. The back wall of the outer hinge-lid container is the wall comprising the hinge line.

The term "width" is used to describe the dimension of an element, such as a panel of a blank or a wall of a container as measured in the transverse direction.

The term "panel" is used throughout this specification to refer to a portion of the blank that is used to form a wall in the assembled container. A panel may depend along one or more fold lines from one or more other panels.

The term "fold line" refers to a fold between two adjacent panels. When forming the container, adjacent panels are folded along their common fold line, which may come to define an edge of the container or of a portion of the container.

In the assembled container a "wall" may be formed of one or of several overlying panels.

Where there are several overlying panels, these may be attached to each other, for example by means of an adhesive. Further, a wall may be formed from two or more abutting or overlapping panels.

The term "height" is used to describe the dimension of one such element as measured in a direction perpendicular to the width of the element. When describing an element of the blank, reference is generally made to the element in the flat state of the blank.

The term "thickness" is used herein to refer to the minimum distance measured between two opposite surfaces of the sheet blank or of a layer of the sheet blank. In practice, the distance at a given location is measured along a direction locally perpendicular to the opposite surfaces. The "thickness" of layer will generally be substantially constant over the layer (flat profile).

However, local variations may be possible where portions of the sheet blank are, for example, embossed, debossed, weakened, and so forth.

The term "hinge line" refers to a line about which the lid may be pivoted in order to open the hinge-lid housing. A hinge line may be, for example, a fold line or a score line in the panel forming the back wall of the container.

The term "weakened line" is used herein to describe a portion of a surface of the container or package (or the blank from which the container or package is formed) wherein the structural strength of the material, from which the container or package (or blank) is formed has been weakened by any suitable technique, for example with respect to bending, folding or tearing along the line of weakness. For example, a line of weakness may be formed as a scoring line, a creasing line, an ablation line, or a perforation line. Lines of weakness can be created by removal of material, by displacement of material, by compression of material, by locally reducing the forces that hold the material together, such as by breaking fibres in a fibrous material, as well as by combinations of all the above. A line of weakness may be straight, curved, segmented or continuous or a combination thereof. In many instances, a line of weakness is used to assist in positioning a fold line in a blank. A line of weakness can also be used to strengthen the material in a direction perpendicular to the line of weakness, for example by compression. Further, a line of weakness can be used for decorative purpose.

The term "scoring line" is used to describe a line formed by partially cutting into the material of the blank. A scoring line may be formed by removing material from the blank (in which case the scoring line forms a groove or trough in the blank). As an alternative, a scoring line may be formed without removing any material from the blank, typically involving a partial sideways displacement and compression of material, caused by a knife with a non-zero thickness penetrating the material. The depth of the scoring line will be less than the thickness of the blank.

The term "creasing line" is used to describe a line formed by displacing a portion of the material vertical to the plane of the blank, forming a groove or trough in the blank. The displacement may involve compression and typically involves the use of a compression tool, such as a roller. Alternatively, or in addition, the material in the creasing line may be displaced so as to at least partially protrude from the opposite side of the blank. Generally, no material is removed when a creasing line is formed.

The term "ablation line" is used to describe a line formed by removing material from a surface of the blank to a predetermined depth by way of ablation (for example, by way of a laser beam or a blade).

The term "perforated line" is used to describe a line or sequence of discrete holes or slots in the blank. The holes may be formed by pushing an object through the blank. This may result in material being removed from the blank, for example by punching. Alternatively, the holes could be created without removing material, and instead simply using the object to push the material outwardly from the centre of the hole. As another alternative, the holes may be formed by way of a laser beam.

The term "fold line" is used to describe any line of a blank about which the blank is folded. The fold line may be defined by a line of weakness to assist with the folding action.

Alternatively, a fold can be formed without the presence of a weakened line, depending for example on the pliability of the blank material and other material characteristics.

In the framework of the present invention, paper is a sheet of material produced by mechanically and/or chemically processing cellulose fibres in water. The cellulose fibres may derive from wood, rags, grasses or other vegetable sources. The water is then drained, for example through fine mesh, leaving the fibre evenly distributed on the surface, followed by pressing and drying. The sheet of paper may also comprise in addition to the pulp also fillers, and additives. The used pulp can be bleached or unbleached and obtained from a variety of processes. Among those, suitable pulp types are hardwood kraft pulp, softwood kraft pulp, sulfite pulp or other chemical pulp, mechanical pulp, thermomechanical pulp, chemi-thermomechanical pulp, or other types of mechanical pulp, recycled paper pulp can also be used. For the purpose of this invention, thermomechanical pulp, chemi-thermomechanical pulp (CTMP), chemical pulp or their blends, are preferred.

As used herein, aerosol-forming article is any article that generates an inhalable aerosol when an aerosol-forming substrate is heated. The term includes articles that comprise an aerosol-forming substrate that is heated by an external heat source, such as an electric heating element. An aerosol-forming article may be a non-combustible aerosol-forming article, which is an article that releases volatile compounds without the combustion of the aerosol-forming substrate. An aerosol-forming article may be a heated aerosol-forming article, which is an aerosol-forming article comprising an aerosol-forming substrate that is intended to be heated rather than combusted in order to release volatile compounds that can form an aerosol. The term includes articles that comprise an aerosol-forming substrate and an integral heat source, for example a combustible heat source.

Aerosol-forming articles according to the present invention may be in the form of filter combustible cigarettes or other smoking articles in which tobacco material is combusted to form smoke.

Preferably, the aerosol-forming article may be substantially cylindrical in shape. The aerosol-forming article may be substantially elongated. The aerosol-forming article may have a length and a circumference substantially perpendicular to the length. The aerosol-forming article may have a total length between about 30 millimetres and about 100 millimetres. The aerosol-forming article may have an external diameter between about 5 millimetres and about 12 millimetres.

The invention is defined in the claims. However, below there is provided a non-exhaustive list of non-limiting examples. Any one or more of the features of these examples may be combined with any one or more features of another example, embodiment, or aspect described herein.

Example Ex1: A method of making a container for consumer goods, the method comprising:

folding a first cellulose based layer to form a package, the package defining a housing for the consumer goods;

forming an outer wrapper, the outer wrapper comprising a second cellulose based layer having an inner surface defining an inner area and an outer surface defining an outer area, a first polymeric layer provided on the inner surface and a second polymeric layer provided on less than 30 percent of the outer surface;

wherein the first polymeric layer and the second polymeric layer are heat sealable layers;

wrapping the package with the outer wrapper, wherein the wrapping is made so that the first polymeric layer is provided on an inner side of the second cellulose based layer;

heating the package and the outer wrapper to seal the outer wrapper on the package, forming the container.

Example Ex2: The method according to Ex1, wherein heating the package and the outer wrapper comprises:

heating the package and the outer wrapper while applying pressure, to seal the outer wrapper on the package.

Example Ex3: The method according to Ex1 or Ex2, comprising:

folding the first cellulose based layer to form a package comprising a lid portion and a box portion, the box portion and the lid portion being divided by an opening line, the lid portion being hinged to the box portion;

wrapping the box portion and the lid portion with the outer wrapper, the outer wrapper covering, at least in part, the opening line.

Example Ex4: The method according to Ex3, wherein the opening line comprises a first weakened line.

Example Ex5: The method according to Ex3 or Ex4, comprising the step of:

covering the opening line with the outer wrapper completely.

Example Ex6: The method according to one or more of the preceding Ex1-Ex5, wherein the step of folding a first cellulose based layer forming a package comprises folding the first cellulose based layer forming a package defining a base wall and a top wall; and the method comprises the step of:

providing the second polymeric layer on portions of the outer surface of the second cellulose based layer which cover the top wall or the base wall of the package when the outer wrapper is wrapped around the package.

Example Ex7: The method according to one or more of the preceding Ex1-Ex6, wherein the step of forming the outer wrapper comprises:

coating the inner surface of the second cellulose based layer with the first polymer layer.

Example Ex8: The method according to one or more of Ex1-Ex6, wherein the step of forming an outer wrapper comprises the step of providing a third polymeric layer.

Example Ex9: The method according to Ex8, wherein the third polymeric layer is located between the second cellulose based layer and the first polymeric layer.

Example Ex10: The method according to Ex8 or Ex9, wherein the third polymeric layer is a moisture barrier layer.

Example Ex11: The method according to any of Ex8-Ex10, comprising the steps of:

coating the inner surface of the second cellulose based layer with the third polymer layer; and coating an inner surface of the third polymer layer with the second polymer layer.

Example Ex12: The method according to one or more of the preceding Ex1-Ex11, wherein the step of forming the outer wrapper comprises:

coating the outer surface of the second cellulose based layer with the second polymeric layer.

Example Ex13: The method according to one or more of the preceding Ex1-Ex12, comprising:

folding the first cellulose based layer to form a package comprising a lid portion and a box portion, the box portion and the lid portion being divided by an opening line, the lid portion being hinged to the box portion;

wrapping the box portion and the lid portion with the outer wrapper, the outer wrapper covering, at least in part, the opening line;

forming a second weakened line on the portion of the outer wrapper covering the opening line.

Example Ex14: The method according to Ex13, comprising:

opening the lid portion by tearing or breaking the second weakened line.

Example Ex15: The method according to Ex14 and Ex4, comprising:

opening the lid portion by tearing or breaking the first weakened line and the second weakened line.

Example Ex16: The method according to one or more of Ex13-Ex15, wherein forming a second weakened line comprises:

forming the second weakened line on the second cellulose based layer before providing the second cellulose based layer with the first polymeric layer or the second polymeric layer.

Example Ex17: The method according to one or more of the preceding claims, comprising:

printing indicia regarding the consumer goods or the manufacturer of the consumer goods on portions of the outer surface of the second cellulose based layer not covered by the second cellulose based layer.

Example Ex18: The method according to one or more of the preceding Ex1-Ex17, wherein providing a first polymeric layer or providing a second polymeric layer or providing a third polymeric layer comprises forming a composition comprising one or more of:

a polymer or copolymer of ethylene;

a polymer or copolymer of propylene;

a copolymer of styrene acrylate;

a copolymer of styrene butadiene;

a copolymer of styrene isoprene;

a copolymer of hydrogenated styrene butadiene;

a copolymer of hydrogenated styrene isoprene;

a copolymer of an ester of acrylic or methacrylic acid;

a copolymer of vinyl acetate.

Example Ex19: The method according to Ex18, wherein the composition comprises a polymer, copolymer or omopolymer of ethylene and one selected from:

propylene;
1-butene;
isobutylene;
1-octene;
1-exene;
norbornene;
vinyl acetate;
acrylic or metacrylic esters;
acrylic or metacrylic acids;
dicyclopentadiene.

Example Ex20: The method according to Ex18, wherein the composition comprises a polymer, copolymer or omopolymer of propylene and one selected from:

ethylene;
1-butene;
Isobutylene;
1-octene;
1-exene;
norbornene;
vinyl acetate;
acrylic or metacrylic esters;
acrylic or metacrylic acids;
dicyclopentadiene.

Example Ex21: The method according to one of Ex18-Ex20, wherein the composition further comprises wax.

Example Ex 22: The method according to Ex21, wherein the wax comprises one or more of:

paraffin wax;
polyethylene wax;
microcrystalline wax;
polypropylene wax.

Example Ex 23: The method according to one or more of Ex18-Ex22, wherein the composition further comprises:

hydrocarbon resin.

Example Ex 24: The method according to Ex23, wherein the hydrocarbon resin comprises one or more of:

hydrogenated hydrocarbon resin;
polyterpene resin.

Example Ex25: The method according to one or more of Ex18-Ex25, wherein the composition is a hot melt composition.

Example Ex26: A container for consumer goods, the container comprising:

a package comprising a box portion and a lid portion, the package defining a housing for the consumer goods, the lid portion being hinged to the box portion by a hinge line, an opening line separating the box portion and the lid portion outside the hinge line, the box portion and the lid portion being formed by folding a first multilayer blank comprising a first cellulose based layer;

an outer wrapper wrapped and sealed on the package and covering at least partly the opening line, the outer wrapper comprising:

a second cellulose based layer having an inner surface and an outer surface;

a first polymeric layer provided on the inner surface of the second cellulose based layer;

a second polymeric layer provided on less than 30 percent of the outer surface of the second cellulose based layer;

wherein the first polymeric layer and second polymeric layer are heat sealable layers.

Example Ex27: The container according to Ex26, wherein the opening line comprises a first weakened line.

Example Ex28: The container according to Ex26 or Ex27, wherein the outer wrapper comprises a third polymer layer.

Example Ex29: The container according to Ex28, wherein the third polymer layer is located between the second cellulose based layer and the first polymer based layer.

Example Ex30: The container according to Ex28 or Ex29, wherein the third polymer layer is a moisture barrier layer.

Example Ex31: The container according to Ex27, wherein the outer wrapper comprises a second weakened line formed on the portion of the outer wrapper covering the opening line.

Example Ex32: The container according to one or more of claims Ex26-Ex31, wherein the package comprises a base wall and a top wall; and wherein the second polymeric layer is provided on portions of the outer surface of the second cellulose based layer covering the base wall or the top wall.

Example Ex33: The container according to Ex31, wherein the second cellulose based layer has a first thickness and the second weakened line includes an etched line having a depth not greater than 80 percent of the first thickness.

Example Ex34: The container according to one or more of Ex26-Ex33, wherein the first polymeric layer or the second polymeric layer or the third polymeric layer comprises a composition comprising one or more of:

a polymer or copolymer of ethylene;
a polymer or copolymer of propylene;
a copolymer of styrene acrylate;
a copolymer of styrene butadiene;
a copolymer of styrene isoprene;
a copolymer of hydrogenated styrene butadiene;
a copolymer of hydrogenated styrene isoprene;
a copolymer of an ester of acrylic or methacrylic acid;
a copolymer of vinyl acetate.

Example Ex35: The container according to Ex34, wherein the composition comprises a polymer, copolymer or omopolymer of ethylene and one selected from:

propylene;
1-butene;
Isobutylene;
1-octene;
1-exene;
norbornene;
vinyl acetate;
acrylic or metacrylic esters;
acrylic or metacrylic acids;
dicyclopentadiene.

Example Ex36: The container according to Ex35, wherein the composition comprises a polymer, copolymer or omopolymer of propylene and one selected from:

ethylene;
1-butene;
isobutylene;
1-octene;
1-exene;
norbornene;
vinyl acetate;
acrylic or metacrylic esters;
acrylic or metacrylic acids;
dicyclopentadiene.

Example Ex37: The container according to one of Ex34-Ex36, wherein the composition further comprises wax.

Example Ex38: The container according to Ex37, wherein the wax comprises one or more of:

paraffin wax;
polyethylene wax;
microcrystalline wax;
polypropylene wax.

Example Ex39: The container according to one or more of Ex34-Ex38, wherein the composition further comprises:

hydrocarbon resin.

Example Ex40: The container according to Ex39, wherein the hydrocarbon resin comprises one or more of:

hydrogenated hydrocarbon resin;

polyterpene resin.

Example Ex41: The container according to Ex37 or Ex38, or the method according to Ex21 or Ex22, wherein, in weight, the content of wax is comprised between 10 percent and 70 percent with respect to the total weight of the composition.

Example Ex42: The container according to Ex37 or Ex38, or the method according to Ex21 or Ex22, wherein, in weight, the content of wax is comprised between 10 percent and 40 percent with respect to the total weight of the composition.

Example Ex43: The container according to claim Ex39 or Ex40, or the method according to Ex23 or Ex24, wherein, in weight, the content of hydrocarbon resin is comprised between 30 percent and 50 percent with respect to the total weight of the composition.

Example Ex44: The container according to one or more of Ex34-Ex43, or the method according to one or more of Ex18-Ex24 or Ex41-Ex43, wherein, in weight, the content of the one or more polymer or copolymer is comprised between 30 percent and 50 percent with respect to the total weight of the composition.

Example Ex45: The method according to one or more of Ex1-Ex25 or Ex41-Ex44 or the container according to one or more of Ex26-Ex44, wherein the first cellulose based layer has a basis weight comprised between 170 grams per square meter and 270 grams per square meter.

Example Ex46: The method according to one or more of Ex1-Ex25 or Ex41-Ex45 or the container according to one or more of Ex26-Ex45, wherein the second cellulose based layer has a basis weight comprised between 40 grams per square meter and 70 grams per square meter.

Example Ex47: The method according to one or more of Ex1-Ex25 or Ex41-Ex46 or the container according to one or more of Ex26-Ex46, wherein the first polymeric layer has a basis weight comprised between 4 grams per square meter and 15 grams per square meter.

Example Ex48: The method according to one or more of Ex1-Ex25 or Ex41-Ex47 or the container according to one or more of Ex26-Ex47, wherein the second polymeric layer has a basis weight comprised between 3 grams per square meter and 15 grams per square meter.

Example Ex49: The method according to one or more of Ex1-Ex25 or Ex41-Ex48 or the container according to one or more of Ex26-Ex48, wherein the third polymeric layer has a basis weight comprised between 5 grams per square meter and 10 grams per square meter.

Example Ex50: The method according to one or more of Ex1-Ex25 or Ex41-Ex49 or the container according to one or more of Ex26-Ex49, wherein the first cellulose based layer has thickness comprised between 170 micrometers and 400 micrometers.

Example Ex51: The method according to one or more of Ex1-Ex25 or Ex41-Ex50 or the container according to one or more of Ex26-Ex50, wherein the second cellulose based layer has thickness comprised between 30 micrometers and 60 micrometers.

Example Ex52: The method according to one or more of Ex1-Ex25 or Ex41-Ex51 or the container according to one or more of Ex26-Ex51, wherein the first polymeric layer or the second polymeric layer has a melting point measured according to differential scanning calorimetry (DSC) lower than 120 degrees Celsius.

Example Ex53: The method according to one or more of Ex1-Ex25 or Ex41-Ex52 or the container according to one or more of Ex26-Ex52, wherein the third polymeric layer does not show a thermoplastic behaviour at the temperature and pressure used to bond the first and the second polymeric layer.

Example Ex54: The method according to one or more of Ex1-Ex25 or Ex41-Ex53 or the container according to one or more of Ex26-Ex53, wherein the third polymeric layer has a melting point measured according to differential scanning calorimetry (DSC) higher than the melting temperature of the first polymeric layer and of the second polymeric layer.

Examples will now be further described with reference to the figures in which:

FIG. 6 is a different embodiment of the element of FIG. 4, in a side view;

FIG. 7 is a front view of an embodiment of the element of FIGS. 4-6;

Figure 1:
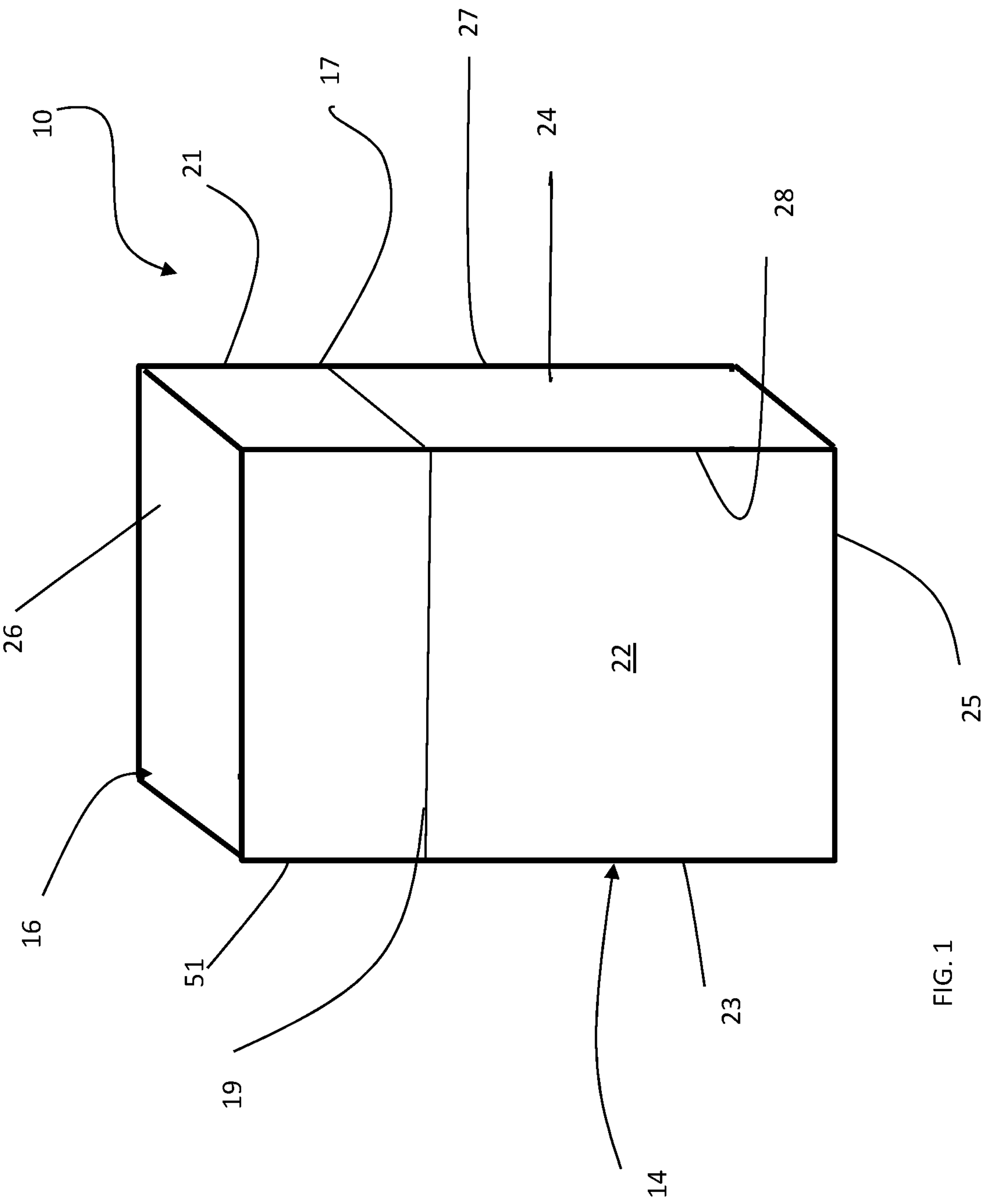
FIG. 1 is a perspective schematic view of a component of a container according to the invention.

FIG. 1 shows a package 10 to be used in a container realized in accordance with the present invention. The package 10 has the shape of a rectangular parallelepiped and includes a box portion 14 and a lid portion 16. The parallelepiped defines a back wall 21, a front wall 22, a left side wall 23, a right side wall 24, a bottom wall 25 and a top wall 26.

The package further comprises a first right corner 27 and a second right corner 28 of the package 10. First right corner 27 is formed between the back wall 21 and the right side wall 24, while second right corner 28 is formed between the front wall 22 and the right side wall 24. The package 10 also comprises a first left corner 29 formed between the back wall 21 and the left side wall 23, and a second left corner 51 formed between the front wall 22 and the left side wall 23 (corner 29 is visible in FIG. 14).

The lid portion 16 is hinged about a hinge line 17 extending across a back wall of the parallelepiped. Further, the package 10 defines a housing or inner volume (not depicted in the drawings) containing for example a group of aerosol generating articles (not shown in the drawings). When the package 10 is closed, the lid portion 16 and the box portion 14 defines an opening line 19 which is the separation line between the lid portion and box portion. The opening line 19 is the geometrical continuation of the hinge line 17. The opening line 19 is formed on the left side wall 23, right side wall 24 and on the front wall 22.

The opening line 19 is a first weakened line, such as a cut, so that the package 10 can be opened immediately, or it may be perforated, and therefore the package 10 cannot be opened, unless the opening line is broken 19.

Figure 3:
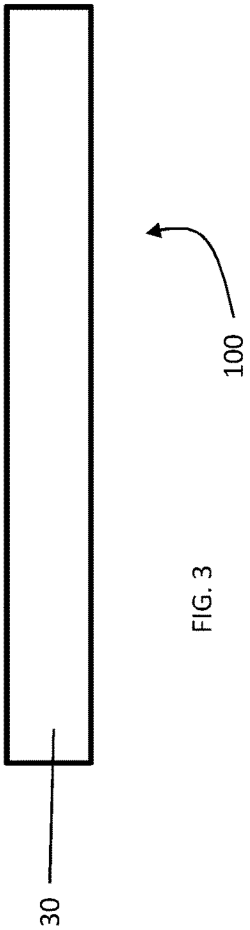
FIG. 3 is an enlarged side view of the element of FIG. 2.
Figure 2:
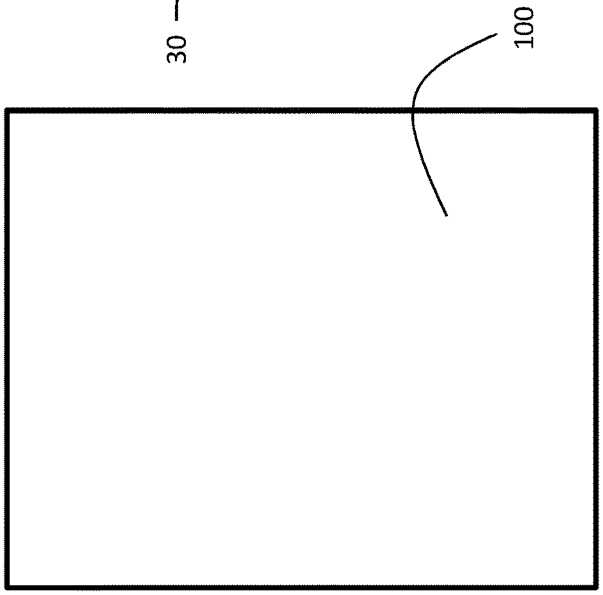
FIG. 2 is a front view of an element of the component of the container of FIG. 1.
Figure 5:
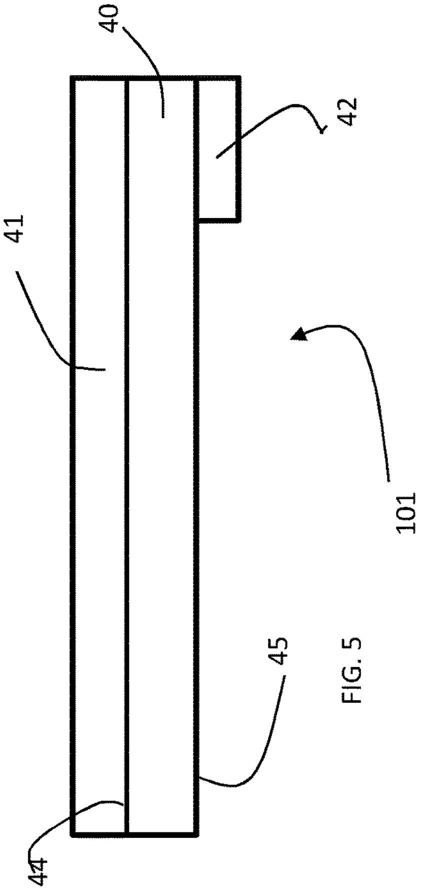
FIG. 5 is an enlarged side view of the element of FIG. 4.

The package 10 is formed from a sheet blank 100 depicted in FIGS. 2 and 3. As illustrated in the lateral view of FIG. 3, the sheet blank 100 comprises a first cellulose based layer 30 comprising a cellulosic material. More preferably, the sheet blank consists in a first sheet of cellulose based material 30. In more detail, the first cellulose based layer 30 is formed from a sheet of a paper-based material. Preferably, the first cellulose based layer 30 has a basis weight comprised between 170 gsm and 270 gsm. Preferably, first cellulose based layer has thickness comprised between 170 micrometers and 400 micrometers.

The sheet blank 100 is folded as known in the field to form the package 10. Any geometrical shape of the package is possible.

The package 10 formed by suitably folding the sheet blank 100 is then wrapped using an outer wrapper in order to form a container 1 (shown in FIG. 17) to contain consumer goods (not shown), for example for containing aerosol generating articles.

Figure 4:
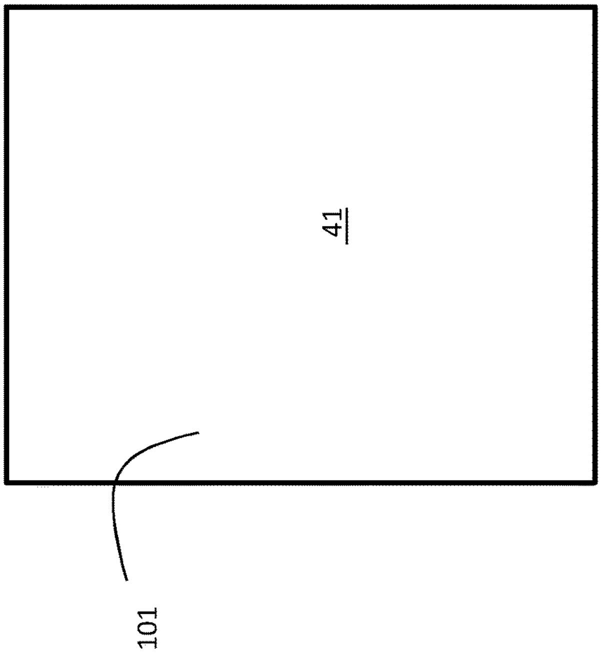
FIG. 4 is a front view of an element of another component of the container according to the invention.

The outer wrapper is formed from a sheet blank 101 depicted in FIGS. 4-9. In a first embodiment illustrated in FIG. 5, the sheet blank 101 comprises a second cellulose based layer 40 comprising a second cellulosic material, a first polymeric layer 41 and a second polymeric layer 42 both having heat sealing and moisture barrier properties. The second cellulose based layer 40 has an inner surface 44 and an outer surface 45. The first polymeric layer 41 covers the inner surface 44 of the second cellulose based layer 40 completely, as depicted in FIG. 4. The second polymeric layer 42 covers one or more portions of the outer surface 45 of the second cellulose based layer. The area covered by the portions on which the second polymeric layer is deposited is less than 30 percent of the total area of the outer surface 45.

In more detail, the second cellulose based layer 40 is formed from a sheet of a paper-based material. Preferably, the second cellulose based layer 40 has a basis weight comprised between 40 gsm and 70 gsm. Preferably, the second polymeric layer 42 has a basis weight comprised between 3 gsm and 15 gsm. Preferably, the first polymeric layer has a weight comprised between 4 gsm and 15 gsm. Preferably, the thickness of the second cellulose based layer 40 is comprised between 30 micrometers and 60 micrometers.

Figure 8:
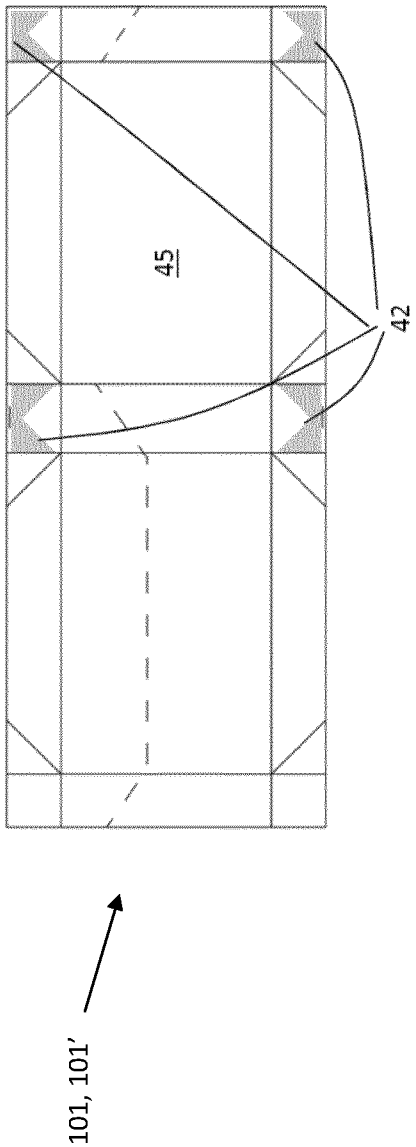
FIG. 8 is a front view of another embodiment of the element of FIGS. 4-6.
Figure 9:
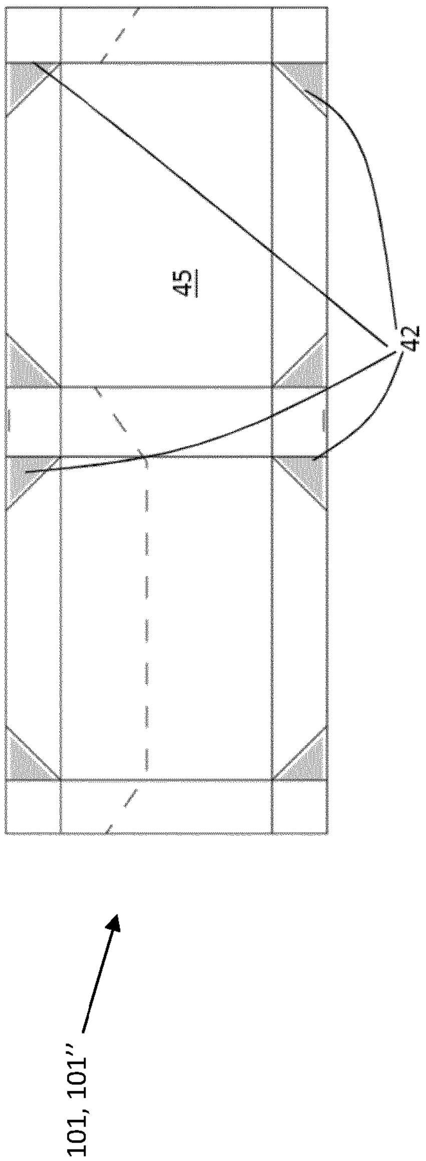
FIG. 9 is a front view of another embodiment of the element of FIGS. 4-6.

In a different embodiment depicted in FIG. 6, the sheet blank 101' forming the outer wrapper comprises a third polymeric layer 43. The third polymeric layer 43 is a moisture barrier layer. Preferably, the third polymeric layer is located between the inner surface 44 of the second cellulose based layer 40 and the first polymeric layer 41. Preferably, the third polymeric layer 43 has a basis weight comprised between 5 grams per square meter and 10 grams per square meter. In both embodiments of FIGS. 5 and 6, the second polymeric layer 42 is covering one or more portions of the outer surface 45 of the second cellulose based layer 40 according to preferred patterns. Possible embodiments of these patterns are depicted in FIGS. 7-9. The second polymeric layer preferably covers portions of the outer surface that, when the outer wrapper is wrapped around the package 10, correspond to portions at the top wall 26 or at the bottom wall 25 of the package. In FIGS. 7-9 the areas covered by the second polymeric layer are the "grey" areas. As visible, these areas are located in those portions of the blank 101, 101' that, when folded, covers the top wall or bottom wall of the package 10.

In order to form the container 1, the outer wrapper formed by blank sheet 101 is wrapped around the package 10 as shown in FIGS. 10-17. First, on the blank sheet 101 or 101', a second weakened line 48 is formed. The second weakened line 48 is formed on the blank sheet 101, 101' in such a way that, when the blank sheet 101, 101' is wrapped around the package 10, the second weakened line 48 is congruent to the opening line 19, as it is visible in FIGS. 15-17.

The second weakened line 48 may be manufactured with a laser scoring process or partial mechanical cutting of the second cellulose based layer 40 over its thickness without damaging the sealable and moisture barrier layers.

The second weakened line 48 is formed on the second cellulose based layer 40. The scoring is done on the outer surface 45 of the second cellulose based layer 40 which becomes the outer surface of the container 1. The depth of the scoring is controlled in order not to impact the moisture barrier properties of the third polymeric layer 43 or the heat sealable properties of the first polymeric based layer 41. The second weakened line 48 is not realized in areas of the outer surface 45 which are covered by the second polymeric layer 42.

Considering the scoring tolerances for both laser and mechanical processes and to have good functionality (ease of opening), the scoring depth is preferably between 50 percent to 80 percent of the thickness of the second cellulose based layer 40. For laser scoring 1000 watts $CO_2$ laser may be used. Beam control of the laser may take place through a scanner. Process may be reel-to-reel with speed of 200 meters/minute.

In case of mechanical scoring, a rotary cutting unit may be used. The operation is performed inserting the second cellulose based layer between knife of the cutting unit and a blind counter roller. Distance between knife and counter roller is between 15 micrometers to 30 micrometers depending on the substrate.

In the FIGS. 10-19 only blank 101 is shown, however the same process applies to blank 101'.

Figures 10, 11, 12, 13, 14, 15, 16, 17, 18, 19:
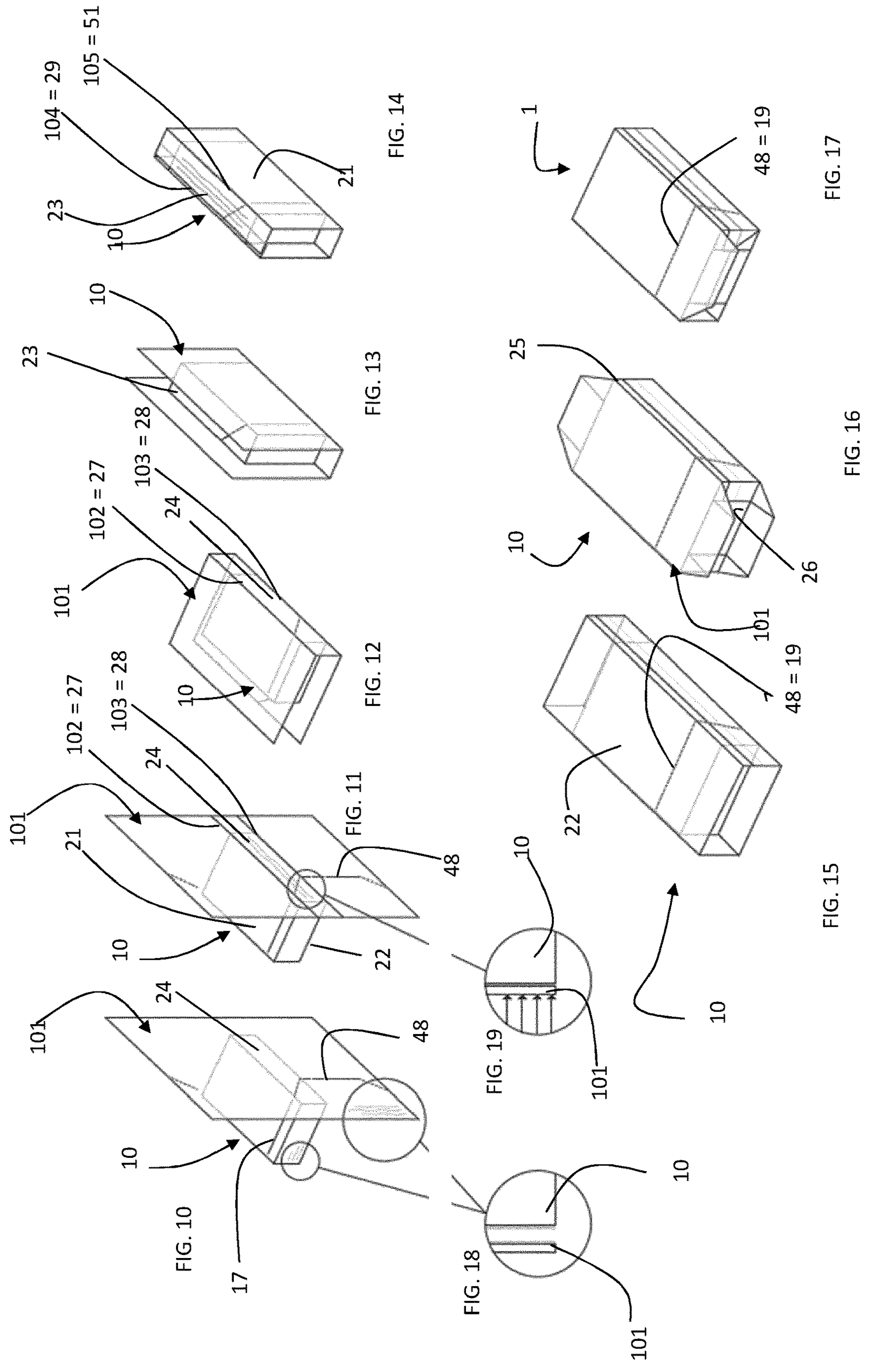
FIGS. 10-17 are perspective views of steps of the method for the realization of the container of FIG. 1.
FIG. 18 is a schematic enlarged view of a detail of FIG. 10.
FIG. 19 is a schematic enlarged view of a detail of FIG. 11.

The sheet blank 101, 101' of the outer wrapper is put in abutment with the right side wall 24 of the package 10 (see FIG. 10). The sheet blank 101, 101' is positioned in such a way that the first polymeric layer 41 contacts the first cellulose based layer 40 at the right side wall 24. The first polymeric layer 41 is thus the inner layer of the outer wrapper and the second cellulose based layer 40 is the outer layer of the outer wrapper.

The enlarged view in FIG. 18 (corresponding to the circled features of FIG. 10) shows how blank 101 is applied to package 10, putting the blank into contact with the package. Two fold lines 102, 103 are formed in the sheet blank 101, corresponding to the location of the first and second right corners 27, 28 of the package 10. This is depicted in FIG. 11. The sheet blank 101 is then compressed against the side wall 24 as depicted by the arrows in the inlet of FIG. 19 (which corresponds to the circled portion of FIG. 11).

The blank sheet 101 is then folded at the two fold lines 102, 103, so that the front wall 22 and back wall 21 of the package 10 are also in contact with the outer wrapper. This is depicted in FIG. 12.

The package 10 is then preferably re-oriented in order to facilitate wrapping, for example the left side wall 23 may now face upwards, as shown in FIG. 13.

Two additional fold lines are then formed in the sheet blank 101, fold lines 104, 105, corresponding to the location of the first and second left corners 29, 51. The sheet blank 101 is then folded at the two fold lines 104, 105 and two opposite flaps of the sheet blank overlaps on the left side wall 23. This is depicted in FIG. 14. A panel of sheet blank 101 is formed thus on the left side wall 23, right side wall 24, front wall 22 and back wall 21 of package 10. In this way, the whole opening line 19 and the hinge line 17 are covered by the outer wrapper. The package 10 and outer wrapper are then preferably re-oriented, so that the front wall 22 now faces upwards, as shown in FIG. 15.

The sheet blank 101 is then folded in a known manner (called "envelope folding") in order to cover top wall 26 and bottom wall 25 of the package 10. This is shown in FIGS. 16 and 17. In FIG. 17, the whole package 10 is covered by the outer wrapper, which form a panel on each wall of the package 10. The second weakened line 48 is located congruent to the opening line 19 located underneath.

Heat and pressure is applied to fix and join the outer wrapper to the package 10. For example, a temperature of 110 degrees Celsius, and a pressure of 1 Newton per square centimetre ($N/cm^2$) are applied for a time of 100 milliseconds. These conditions provides a satisfactory seal and high adhesion.

EXAMPLE 1

Outer Wrapper

A first embodiment of sheet blank 101 is given.

The second cellulose based layer 40 is a 50 grams per square meter paper. The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

The composition forming the first polymer layer comprises:

- 40 percent in weight of an ethylene vinyl acetate copolymer having a vinyl acetate comonomer content of 18 percent by weight and a MFI (melt flow index) above 500 grams/minute at 190° C. and 2.16 kg weight (EVATANE 18-550 from SK Polymers);
- 35.6 percent in weight of a C9 hydrogenated hydrocarbon resin (Novares Pure 1120 from Rain Carbon);
- 20 percent in weight of a paraffin wax (Parvan 1470 from Exxon Mobil);
- 4 percent in weight of a microcrystalline PE wax (Multiwax 180-MH from Sonneborn); and
- 0.4 percent in weight of Pentaerythritol tetrakis(3,5-di-tert-butyl-4-hydroxyhydrocinnamate), such as Irganox 1010 (from BASF, CAS number 6683-19-8). This substance prevents unwanted degradation/oxidation of the hot-melt composition during processing.

This composition was prepared in sigma blade mixer at a temperature of 170° C.

The resulting coated paperboard (sheet blank 101) has a moisture permeability of 11 grams/m2/day at 38° C. and 90% RH (determined by ISO 2528:1995).

EXAMPLE 2

Outer Wrapper

A second embodiment of sheet blank 101 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

The composition forming the first polymer layer comprises:

- 40 percent in weight of a low molecular weight polyethylene resin (Epolene C-15 from Westlake), this polymer has a MFI (melt flow index) above 4000 grams/minute;
- 25.8 percent in weight of a C9 hydrogenated hydrocarbon resin (Novares Pure 1120 from Rain Carbon);
- 17 percent in weight of a Styrene Modified Polyterpene Resin (Sylvares 6100 from Kraton);
- 15 percent in weight of paraffin wax (Parvan 1470 from Exxon Mobil);
- 2 percent in weight of a microcrystalline PE wax (Multiwax 180-MH from Sonneborn); and
- 0.2 percent in weight of Irganox 1010 (from BASF).

The resulting coated paperboard (sheet blank 101) has a moisture permeability of 8 grams/m2/day at 38° C. and 90% RH (determined by ISO 2528:1995).

EXAMPLE 3

Outer Wrapper

A third embodiment of sheet blank 101 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

- 39.9 percent in weight of Polyolefin Plastomer (Affinity GA1900 from Dow Inc.);
- 30 percent in weight of a C9 hydrogenated hydrocarbon resin (Novares Pure 1120 from Rain Carbon);
- 20 percent in weight of paraffin wax (Parvan 1470 from Exxon Mobil);
- 10 percent in weight of a Fischer-Tropsch wax (GTL Sarawax SX 105 from Shell); and
- 0.1 percent in weight of Irganox 1010 (from BASF).

The resulting coated paperboard (sheet blank 101) has a moisture permeability of 4 grams/m2/day at 38° C. and 90% RH (determined by ISO 2528:1995).

EXAMPLE 4

Outer Wrapper

A fourth embodiment of sheet blank 10 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

The composition forming the first polymer layer comprises:

- 40 percent in weight of ethylene propylene copolymer with low crystallinity (Vistamaxx 8880 from Exxon);
- 25.8 percent in weight of a C9 hydrogenated hydrocarbon resin (Novares Pure 1120 from Rain Carbon);
- 17 percent in weight of a Styrene Modified Polyterpene Resin (Sylvares 6100 from Kraton);
- 15 percent in weight of paraffin wax (Parvan 1470 from Exxon Mobil);
- 2 percent in weight of a microcrystalline PE wax (Multiwax 180-MH from Sonneborn); and
- 0.2 percent in weight of Irganox 1010 (from BASF).

The resulting coated paperboard (sheet blank 101) has a moisture permeability of 6.5 grams/m2/day at 38° C. and 90% RH (determined by ISO 2528:1995).

This composition is similar to the composition of the Example 2, where the low molecular weight polyethylene is replaced with an ethylene propylene copolymer with low crystallinity (Vistamaxx 8880 from Exxon). This composition shows enhanced tackiness and flexibility at low temperature.

EXAMPLE 5

Outer Wrapper

A fifth embodiment of sheet blank 101 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

The composition forming the first polymer layer comprises:

- 40 percent in weight of low crystallinity resin obtained from the metallocene catalyzed polymerization of ethylene with octene (Affinity GA1900 from Dow Chemical Company);
- 25.8 percent in weight of a C9 hydrogenated hydrocarbon resin (Novares Pure 1120 from Rain Carbon);
- 17 percent in weight of a Styrene Modified Polyterpene Resin (Sylvares 6100 from Kraton);
- 15 percent in weight of paraffin wax (Parvan 1470 from Exxon Mobil);
- 2 percent in weight of a microcrystalline PE wax (Multiwax 180-MH from Sonneborn); and
- 0.2 percent in weight of Irganox 1010 (from BASF).

The resulting coated paperboard (sheet blank 101) has a moisture permeability of 12 grams/m2/day at 38° C. and 90% RH (determined by ISO 2528:1995).

This composition is similar to the composition of the Example 2, where the low molecular weight polyethylene is replaced with a low crystallinity resin obtained from the metallocene catalyzed polymerization of ethylene with octene (Affinity GA1900 from Dow Chemical Company). This composition shows enhanced flexibility.

EXAMPLE 6

Outer Wrapper

A sixth embodiment of sheet blank 101 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

The composition forming the first polymer layer comprises:

- 40 percent in weight of amorphous polypropylene based polymer (Eastoflex E1060 from Eastman);
- 25.8 percent in weight of a C9 hydrogenated hydrocarbon resin (Novares Pure 1120 from Rain Carbon);
- 17 percent in weight of a Styrene Modified Polyterpene Resin (Sylvares 6100 from Kraton);
- 15 percent in weight of paraffin wax (Parvan 1470 from Exxon Mobil);
- 2 percent in weight of a microcrystalline PE wax (Multiwax 180-MH from Sonneborn); and
- 0.2 percent in weight of Irganox 1010 (from BASF).

The resulting coated paperboard (sheet blank 101) has a moisture permeability of 16 grams/m2/day at 38° C. and 90% RH (determined by ISO 2528:1995).

This composition is similar to the composition of the Example 2, where the low molecular weight polyethylene is replaced with an amorphous polypropylene based polymer (Eastoflex E1060 from Eastman). This composition shows enhanced tackiness at low temperature.

EXAMPLE 7

Outer Wrapper

A seventh embodiment of sheet blank 101 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

The composition forming the first polymer layer comprises:

- 20 percent in weight of of Styrene Isoprene Copolymer (Kraton D1111 K from Kraton);
- 40 percent in weight of hydrogenated hydrocarbon resin (Eastotac™ H-130 from Eastman);
- 20 percent in weight of polyterpene resin (Piccolyte S125 from DRT);
- 19.5 percent in weight of paraffin wax (Parvan 1470 from Exxon Mobil); and
- 0.5 percent in weight of Irganox 1010.

This composition shows enhanced tackiness.

The resulting coated paperboard (sheet blank 101) has a moisture permeability of 20 grams/m2/day at 38° C. and 90% RH (determined by ISO 2528:1995).

EXAMPLE 8

Outer Wrapper

A eighth embodiment of sheet blank 101 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

- 20 percent in weight of Styrene Isoprene Copolymer (Kraton D1111 K from Kraton);
- 20 percent in weight of amorphous polypropylene based polymer (Eastoflex E1060 from Eastman);
- 20 percent in weight of low viscosity tackifying hydrocarbon resin (Escorez 5690 from Exxon Mobil Chemical);
- 20 percent in weight of hydrogenated hydrocarbon resin (Eastotac™ H-130 from Eastman);
- 16.5 percent in weight of paraffin wax (Parvan 1470 from Exxon Mobil);
- 3 percent in weight of a microcrystalline PE wax (Multiwax 180-MH from Sonneborn); and
- 0.5 percent in weight of Irganox 1010.

The composition shows high tackiness.

The resulting coated paperboard (sheet blank 101) has a moisture permeability of 13 grams/m2/day at 38° C. and 90% RH (determined by ISO 2528:1995).

EXAMPLE 9

Outer Wrapper

A ninth embodiment of sheet blank 101 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

- 20 percent in weight of hydrogenated ethylene norbornene polymer (TOPAS 8007F-600 from Topas);
- 40 percent in weight of hydrogenated hydrocarbon resin (Eastotac™ H-130 from Eastman);
- 20 percent in weight of amorphous polypropylene based polymer (Eastoflex E1060 from Eastman);
- 19.9 percent in weight of paraffin wax (Parvan 1470 from Exxon Mobil); and
- 0.1 percent of Irganox 1010.

This composition shows low tackiness and high viscosity.

The resulting coated paperboard (sheet blank 101) has a moisture permeability of 5 grams/m2/day at 38° C. and 90% RH (determined by ISO 2528:1995).

EXAMPLE 10

Outer Wrapper

A tenth embodiment of sheet blank 101 is given.

The second cellulose based layer 40 is a 50 grams per square meter paper.

The whole inner surface of the paper is coated with the first polymeric layer (15 grams per square meter) using slot-die or curtain coating processes. The current technique allow conveniently applying uniform, thin and defect free layers on fiber-based substrates.

The composition of the first polymeric layer is as follows:

- 10 percent in weight of Styrene Ethylene Butylene Copolymer (Kraton G1657 from Kraton);
- 10 percent in weight of a low crystallinity resin obtained from the metallocene catalyzed polymerization of ethylene with octene (Affinity EG8200G from Dow Chemical Company);
- 39.9 percent in weight of hydrogenated hydrocarbon resin (Regalite R1125 from Eastman);
- 20 percent in weight of paraffin wax having a melting point comprised between 51° C. and 54° C. (Parvan 1270 from Exxon Mobil);
- 20 percent in weight of paraffin wax having a melting point comprised between 62° C. and 65° C. (Parvan 1470 from Exxon Mobil);
- 0.1 percent in weight of Irganox 1010.

This composition shows high tackiness toward paper and high viscosity.

The resulting coated paperboard (sheet blank 101) has a moisture permeability of 8 grams/m2/day at 38° C. and 90% RH (determined by ISO 2528:1995).

Coated multilayer materials according to example 1-10, have been coated on the outer surface with the second polymeric layer (heat sealable layer). The second polymeric layer comprises ethylene vinyl acetate based hot-melt sealant. The second polymeric layer has been deposited according to the pattern of FIG. 7. The composition of the second polymeric layer is identical to the composition of the first polymeric layer as described in Example 1.

EXAMPLE 11

Outer Wrapper

A first embodiment of sheet blank 101' is given.

The second cellulose based layer 40 is a 50 grams per square meter paper.

The whole inner surface of the paper is coated with the third polymeric layer (10 grams per square meter) using coating processes.

The composition of the third polymeric layer (moisture barrier layer) is as follows:

- 40 percent in weight of a high density polyethylene wax (Excerex 40800 from Mitsui);
- 30 percent in weight of hydrogenated hydrocarbon resin (Eastotac™ H-130 from Eastman);
- 20 percent in weight of a low crystallinity ethylene propylene copolymer (Vistamaxx 8880 from Exxon);
- 9.9 percent in weight Paraffin Wax (Parvan 1470 from Exxon Mobil);
- 0.1 percent in weight of Irganox 1010 from BASF.

This "intermediate" material did show a permeability of 8 grams/m2/day and did not show any tackiness nor thermoplastic behavior below 100° C.

The material above was coated with a 6 gsm of the first polymeric layer having the same composition described in Example 1. This first polymeric layer was applied by curtain coating. Moreover, the material was provided with the second polymeric layer according to the pattern of FIG. 7. The composition of the second polymeric layer is the composition detailed for the first polymeric layer in Example 1.

The final moisture permeability of the multilayer blank 101' is 6 grams/m2/day.

Comparative Example

Comparative Example has been made comparing the performances of the following containers:

Comparative container (BOPP film): 20 cigarettes hinge lid packages formed by a lacquered 180-270 gsm paperboard and wrapped with 16 micrometers BOPP film. This container A is represented as a continuous line in FIG. 20.

Container of the invention (Paper Barrier): 20 cigarettes packages were prepared with hinge lid packages made of the sheet blank 100. This blank 100 is made of a 240 gsm (298 microns thick) bleached cellulose pulp (SBS) paperboard (tradename Invercote L PM, produced by IGGESUND PAPERBOARD AB). The hinge lid is then wrapped with sheet blank 101 realized according to Example 3. This container is represented as a dashed line in FIG. 20.

Container BOPP and the container of the invention were placed in climatic chambers to simulate extreme environmental conditions, humidity uptake or loss was monitored via Oven Volatiles Method.

Figure 20:
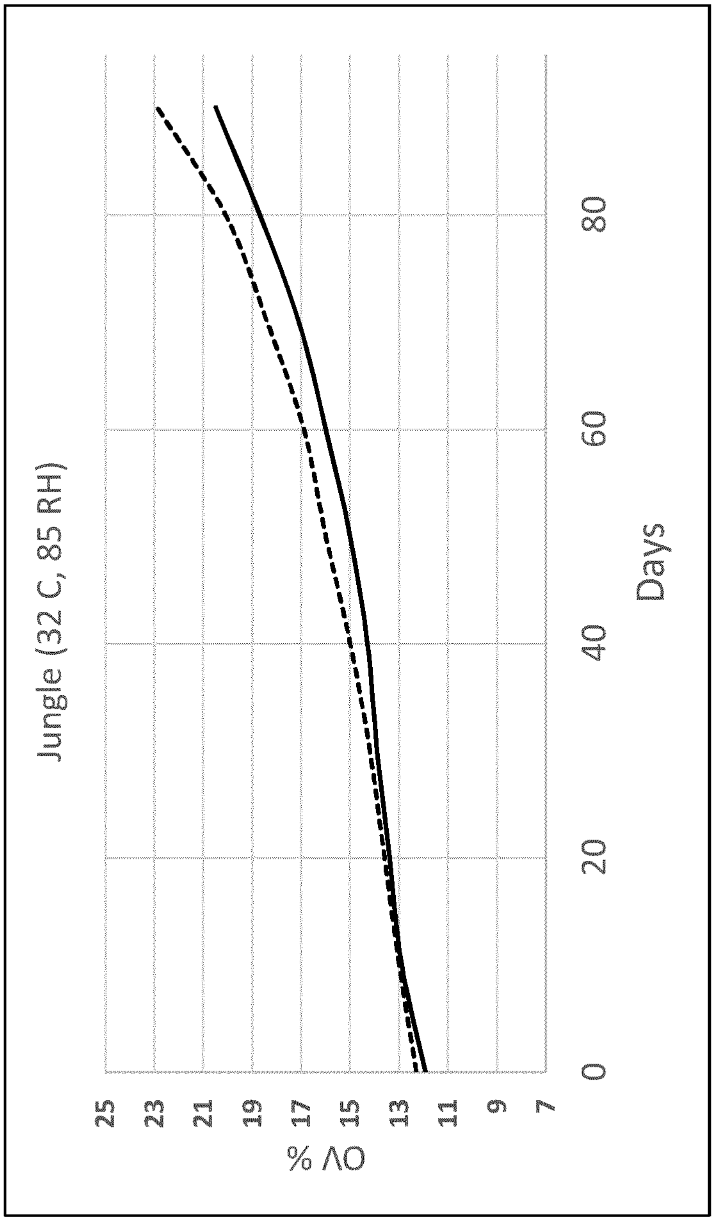
FIG. 20 is a graph showing comparative tests between the container of the invention and a prior art container.

The graph of FIG. 20 shows that the containers according to the invention have a moisture intake or loss similar to comparative container packed in BOPP film.

Oven Volatiles (OV in the drawings) were measured according to method: DETERMINATION OF MOISTURE CONTENT (OVEN VOLATILES) OF TOBACCO AND TOBACCO PRODUCTS, CORESTA Recommended Method 76 (published in July 2017 No. https://www.coresta.org/sites/default/files/technical documents/main/CRM 76-July2017.

The results are shown in FIGS. 14 and 15.

In FIG. 20, the conditions "jungle" are applied. The container BOPP and the container of the invention are kept at a temperature of 32 degrees Celsius and a relative humidity of 85 percent. Container BOPP and container of the invention, as shown by the solid line and dashed line, have a very similar behaviour, that is the oven volatiles slowly increase within 90 days.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±10 percent of A. Within this context, a number A may be considered to include numerical values that are within general standard error for the measurement of the property that the number A represents. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A method of making a container for consumer goods, the method comprising:

folding a first cellulose-based layer to form a package, the package defining a housing for the consumer goods;

forming an outer wrapper, the outer wrapper comprising a second cellulose-based layer having an inner surface defining an inner area and an outer surface defining an outer area, a first polymeric layer provided on the inner surface, and a second polymeric layer provided on less than 30 percent of the outer surface, wherein the first polymeric layer and the second polymeric layer are heat-sealable layers;

wrapping the package with the outer wrapper, wherein the wrapping is made so that the first polymeric layer is provided on an inner side of the second cellulose-based layer; and heating the package and the outer wrapper to seal the outer wrapper on the package, forming the container.

2. The method according to claim 1, further comprising:

folding the first cellulose-based layer to form the package comprising a lid portion and a box portion, the box portion and the lid portion being divided by an opening line, the lid portion being hinged to the box portion; and wrapping the box portion and the lid portion with the outer wrapper, the outer wrapper covering, at least in part, the opening line.

3. The method according to claim 2, wherein the opening line comprises a first weakened line.

4. The method according to claim 1, wherein the step of folding a first cellulose-based layer forming a package comprises folding the first cellulose-based layer forming a package defining a base wall and a top wall;

the method further comprising the step of providing the second polymeric layer on portions of the outer surface of the second cellulose-based layer, which cover the top wall or the base wall of the package when the outer wrapper is wrapped around the package.

5. The method according to claim 1, wherein the step of forming an outer wrapper comprises the step of providing a third polymeric layer.

6. The method according to claim 5, wherein the third polymeric layer is located between the second cellulose-based layer and the first polymeric layer.

7. The method according to claim 5, wherein the third polymeric layer is a moisture barrier layer.

8. The method according to claim 1, further comprising:

folding the first cellulose-based layer to form a package comprising a lid portion and a box portion, the box portion and the lid portion being divided by an opening line, the lid portion being hinged to the box portion;

wrapping the box portion and the lid portion with the outer wrapper, the outer wrapper covering, at least in part, the opening line; and forming a second weakened line on the portion of the outer wrapper covering the opening line.

9. The method according to claim 1, wherein providing a first polymeric layer or providing a second polymeric layer or providing a third polymeric layer comprises forming a composition comprising one or more of:

a polymer or copolymer of ethylene, a polymer or copolymer of propylene, a copolymer of styrene acrylate, a copolymer of styrene butadiene, a copolymer of styrene isoprene, a copolymer of hydrogenated styrene butadiene, a copolymer of hydrogenated styrene isoprene, a copolymer of an ester of acrylic or methacrylic acid, a copolymer of vinyl acetate, and a copolymer of polybutene.

10. The method according to claim 9, wherein the composition further comprises wax.

11. The method according to claim 9, wherein the composition further comprises hydrocarbon resin.

12. A container for consumer goods, the container comprising:

a package comprising a box portion and a lid portion, the package defining a housing for the consumer goods, the lid portion being hinged to the box portion by a hinge line, an opening line separating the box portion and the lid portion outside the hinge line, the box portion and the lid portion being formed by folding a first multilayer blank comprising a first cellulose-based layer; and an outer wrapper wrapped and sealed on the package and having a portion covering at least partly the opening line, the outer wrapper comprising:

a second cellulose-based layer having an inner surface and an outer surface, a first polymeric layer provided on the inner surface of the second cellulose-based layer, and a second polymeric layer provided on less than 30 percent of the outer surface of the second cellulose-based layer, wherein the first polymeric layer and second polymeric layer are heat-sealable layers.

13. The container according to claim 12, wherein the opening line comprises a first weakened line.

14. The container according to claim 12, wherein the outer wrapper further comprises a second weakened line formed on the portion of the outer wrapper covering the opening line.

15. The container according to claim 12, wherein the package further comprises a base wall and a top wall, and a second polymeric layer provided on portions of the outer surface of the second cellulose-based layer covering the base wall or the top wall.

* * * * *